US010814952B2

(12) United States Patent
Inoue et al.

(10) Patent No.: US 10,814,952 B2
(45) Date of Patent: Oct. 27, 2020

(54) BOAT AND HEADING CONTROL METHOD

(71) Applicants: YAMAHA HATSUDOKI KABUSHIKI KAISHA, Iwata, Shizuoka (JP); CPAC Systems AB, Molndal (SE)

(72) Inventors: Hiroshi Inoue, Kennesaw, GA (US); Katsutoshi Naito, Shizuoka (JP); Sebastian Nilsson, Gothenburg (SE); Mathias Lindeborg, Gothenburg (SE)

(73) Assignees: YAMAHA HATSUDOKI KABUSHIKI KAISHA, Shizuoka (JP); CPAC SYSTEMS AB, Molndal (SE)

( * ) Notice: Subject to any disclaimer, the term of this patent is extended or adjusted under 35 U.S.C. 154(b) by 167 days.

(21) Appl. No.: 15/433,050

(22) Filed: Feb. 15, 2017

(65) Prior Publication Data
US 2018/0229823 A1 Aug. 16, 2018

(51) Int. Cl.
B63H 20/12 (2006.01)
B63H 25/42 (2006.01)
G05D 1/02 (2020.01)
B63H 20/00 (2006.01)
B63H 25/02 (2006.01)

(52) U.S. Cl.
CPC ............ B63H 20/12 (2013.01); B63H 25/42 (2013.01); G05D 1/0208 (2013.01); B63H 2020/003 (2013.01); B63H 2025/026 (2013.01); B63H 2025/028 (2013.01); G05D 1/02 (2013.01)

(58) Field of Classification Search
CPC ............ B63H 20/12; B63H 2020/003; B63H 2025/026; B63H 2025/028; B63H 25/42; G05D 1/0208

USPC ........................................................ 701/21
See application file for complete search history.

(56) References Cited

U.S. PATENT DOCUMENTS

| 3,898,881 | A  | * | 8/1975  | Darby, Jr. ............... G01P 5/08  73/181 |
| 8,046,121 | B2 | * | 10/2011 | Mizutani ................ B63H 20/12  114/144 A |
| 8,589,004 | B1 |   | 11/2013 | Kanno |
| 8,700,238 | B2 | * | 4/2014  | Hiramatsu ........... B63H 21/213  114/144 R |
| 8,831,802 | B2 | * | 9/2014  | Mizutani .............. G05D 1/0206  701/21 |
| 8,838,305 | B2 | * | 9/2014  | Mizutani ................ B63H 20/12  701/21 |
| 8,862,293 | B2 | * | 10/2014 | Hara ...................... B63H 25/42  701/21 |
| 2008/0015747 | A1 | * | 1/2008  | Hiroshima ............ F02D 11/105  701/21 |

(Continued)

Primary Examiner — Cuong H Nguyen
(74) Attorney, Agent, or Firm — Global IP Counselors, LLP

(57) ABSTRACT

A boat basically includes a hull, at least one propulsion unit, a heading sensor, a position sensor and a controller. The at least one propulsion unit is movably mounted to the hull, and has a propulsion axis. The heading sensor is configured to detect a heading of the boat. The position sensor is configured to detect a position of the boat. The controller is programmed to turn the at least one propulsion unit relative to the hull such that the propulsion axis moves away from a center point of the boat to correct the heading of the boat upon determining that the boat is drifting in a drift direction based on detection results of the heading sensor and the position sensor.

13 Claims, 12 Drawing Sheets

(56) References Cited

U.S. PATENT DOCUMENTS

| | | | |
|---|---|---|---|
| 2008/0115713 A1* | 5/2008 | Mizutani | B63H 20/12 114/162 |
| 2008/0119974 A1* | 5/2008 | Mizutani | B63H 20/12 701/21 |
| 2008/0233812 A1 | 9/2008 | Kawanishi et al. | |
| 2010/0114412 A1* | 5/2010 | Mizutani | B63H 20/12 701/21 |
| 2010/0256845 A1* | 10/2010 | Mizutani | B63H 23/02 701/21 |
| 2011/0010028 A1* | 1/2011 | Mizutani | B63H 25/00 701/21 |
| 2011/0166724 A1* | 7/2011 | Hiramatsu | B63H 21/213 701/21 |
| 2014/0156124 A1* | 6/2014 | Hara | B63H 5/08 701/21 |
| 2015/0246714 A1* | 9/2015 | Morikami | G05D 1/0206 701/21 |
| 2015/0266557 A1* | 9/2015 | Morikami | B63H 25/42 701/21 |

* cited by examiner

BOAT AND HEADING CONTROL METHOD

BACKGROUND

Field of the Invention

The present invention generally relates to the field of boats.

Background Information

Some boats are provided with functions for station-keeping, which refers to holding a position in the water and not moving relative to the land. For example, some boats are provided with a computer-controlled system for station-keeping to automatically maintain a position and a heading by using its own propulsion units. Station-keeping devices are often used for fishing and ocean researchers.

SUMMARY

Boats are used for many purposes in different styles. For example, there is a need to fish from a boat while the boat is drifting along water flow. In this case, it is desirable that the boat maintains a heading while the boat is drifting along the water flow. In particular, if the boat can maintain the heading while the boat is drifting sideways along the water flow, then many people can enjoy fishing from a side of the boat.

Generally, the present disclosure is directed to various features of a boat with a function for correcting a heading while the boat is drifting.

In accordance with one aspect of the present disclosure, a boat is provided that basically comprises a hull, at least one propulsion unit, a heading sensor, a position sensor and a controller. The at least one propulsion unit is movably mounted to the hull, and has a propulsion axis. The heading sensor is configured to detect a heading of the boat. The position sensor is configured to detect a position of the boat. The controller is programmed to turn the at least one propulsion unit relative to the hull such that the propulsion axis moves away from a center point of the boat to correct the heading of the boat upon determining that the boat is drifting in a drift direction based on detection results of the heading sensor and the position sensor.

In accordance with another aspect of the present disclosure, a boat is provided that basically comprises a hull, a plurality of propulsion units, a heading sensor, a position sensor and a controller. The propulsion units are movably mounted to the hull. The propulsion units are laterally arranged with respect to each other. The heading sensor is configured to detect a heading of the boat. The position sensor is configured to detect a position of the boat. The controller is programmed to drive only one of the propulsion units that is located laterally in a drift direction of the boat relative to a longitudinal center line of the boat to generate one of a forward propulsion force and a reverse propulsion force to correct the heading of the boat upon determining the boat is drifting in the drift direction based on detection results of the heading sensor and the position sensor.

In accordance with another aspect of the present disclosure, a heading control method is provided that basically comprises detecting a heading of a boat by a heading sensor, detecting a position of the boat by a position sensor, determining by a controller a drift direction of the boat based on the heading of the boat and the position of the boat, and turning by the controller at least one propulsion unit that is movably mounted to a hull of the boat relative to the hull such that a propulsion axis of the at least one propulsion unit moves away from a center point of the boat to correct the heading of the boat while the boat is drifting in the drift direction.

In accordance with another aspect of the present disclosure, a heading control method is provided that basically comprises detecting a heading of a boat by a heading sensor, detecting a position of the boat by a position sensor, determining by a controller a drift direction of the boat based on the heading of the boat and the position of the boat, and driving by the controller only one of a plurality of propulsion units to generate one of a forward propulsion force and a reverse propulsion force to correct the heading of the boat while the boat is drifting in the drift direction, the propulsion units being movably mounted to a hull of the boat and laterally arranged with respect to each other, the one of the propulsion units being located laterally in the drift direction of the boat relative to a longitudinal center line of the boat.

Also other features, aspects and advantages of the disclosed boat will become apparent to those skilled in the field of manufacturing boats from the following detailed description, which, taken in conjunction with the annexed drawings, discloses several illustrative embodiments of a boat with various features.

BRIEF DESCRIPTION OF THE DRAWINGS

Referring now to the attached drawings which form a part of this original disclosure.

It should be noted that these figures are intended to illustrate the general characteristics of methods, structure and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Figure 1:
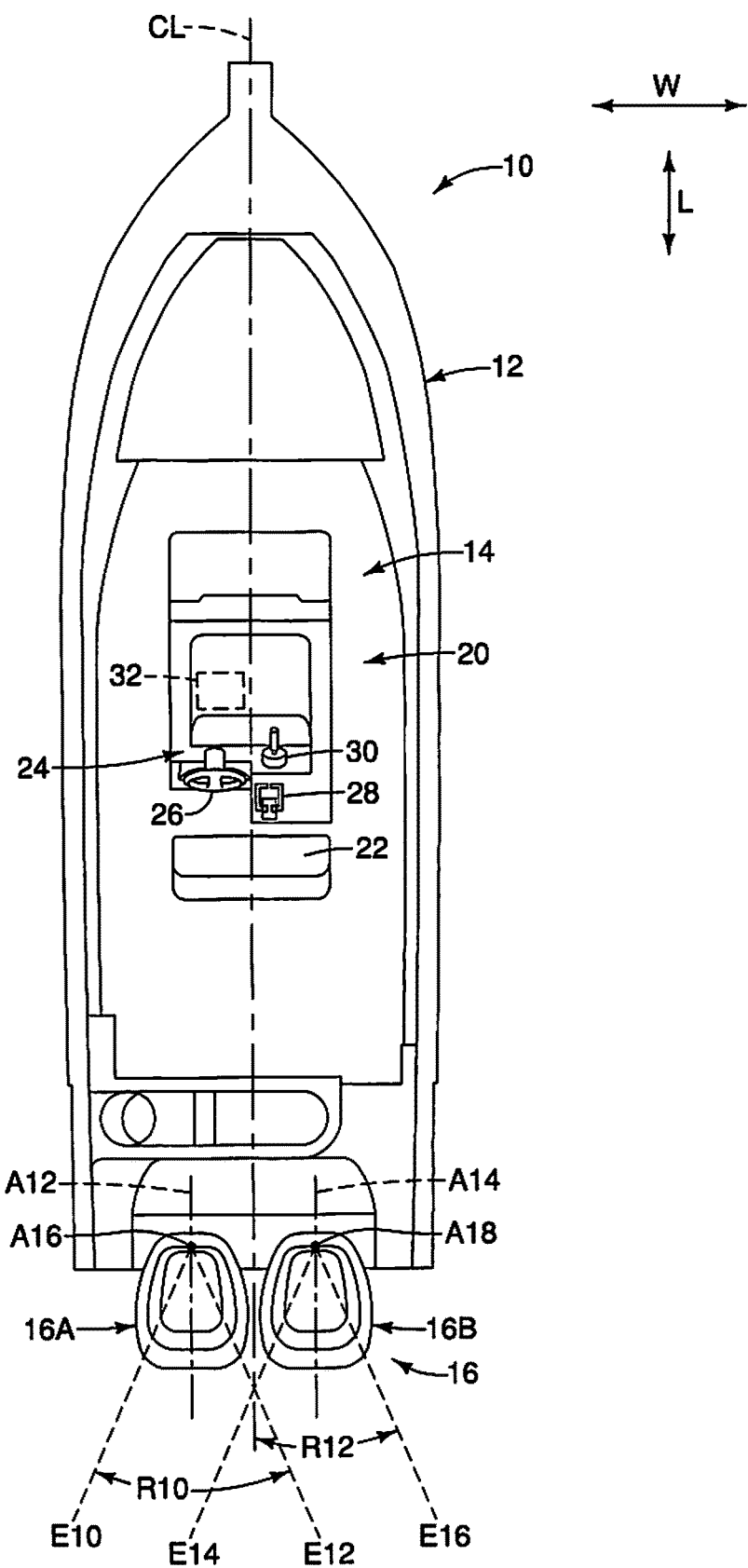
FIG. 1 is a top plan view of a boat equipped with a boat control system and a pair of propulsion units in accordance with one embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments. Referring initially to FIG. 1, a boat 10 is illustrated in accordance with one embodiment. As illustrated in FIG. 1, the boat 10 is an outboard motor boat. Basically, the boat 10 comprises a hull 12, a deck 14 and at least one propulsion unit 16A or 16B. In the illustrated embodiment, two of the propulsion units, such as a left side (port) propulsion unit 16A and a right side (starboard) propulsion unit 16B, are provided in the form of a pair of outboard motors or engines (e.g., a twin outboard configuration). However, the boat 10 is not limited to this illustrated configuration of the illustrated embodiment. The boat 10 can be provided with only a single outboard motor or three or more outboard motors if needed and/or desired depending on the particular design of the boat. Also, the boat 10 can be provided with other types of propulsion units such as a water-jet drive or an inboard motor. In other words, the unique features of the boat 10 can be used with other types of propulsion systems other than the propulsion system illustrated in this embodiment. In any case, the propulsion units 16A and 16B are provided to propel the boat 10 in either a forward or backward direction.

The deck 14 is provided on the hull 12 in a conventional manner. Preferably, the hull 12 and the deck 14 are integrated to form a unit. The hull 12, the deck 14 and the other parts of the boat 10 are made of suitable materials that are typically used in boats for a marine environment, for example, and thus, the materials of the various parts of the boat 10 will not be discussed herein.

Figure 2:
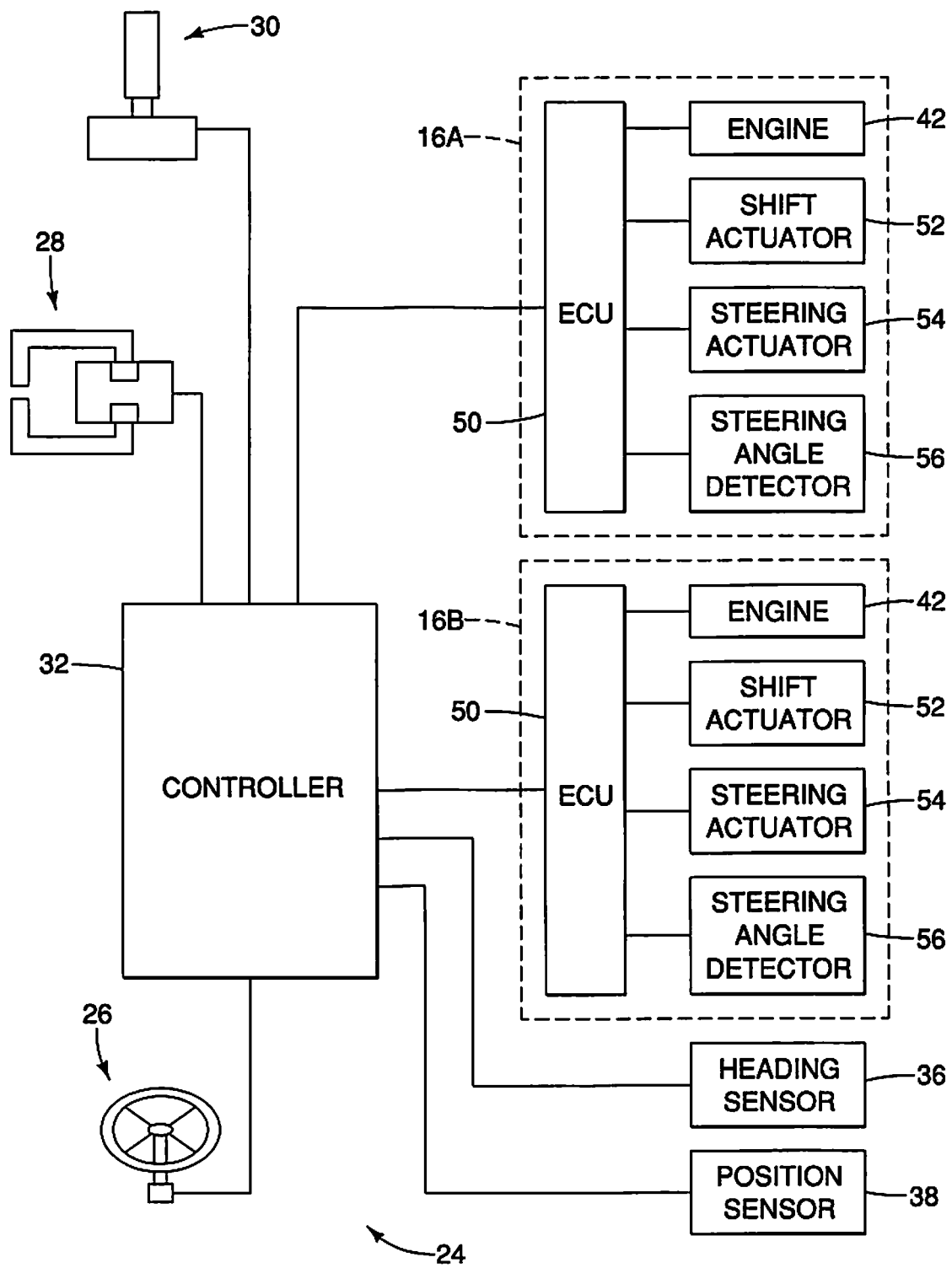
FIG. 2 is a block diagram of the boat control system of the boat illustrated in FIG. 1.

As illustrated in FIG. 1, the deck 14 includes a cockpit 20 that has a cockpit seat 22 and a boat control system 24. As also illustrated in FIG. 2, the boat control system 24 includes a steering or helm 26, a remote control 28, a joystick 30 and a controller 32. The boat control system 24 includes a drive-by-wire system for operating the boat 10, and is configured to perform various operations of the boat 10. Specifically, in the boat control system 24, the steering 26, the remote control 28 and the joystick 30 are electrically connected to the controller 32 to send operation signals to the controller 32. In response, the controller 32 operates the propulsion units 16A and 16B to control the boat 10.

In the illustrated embodiment, the steering 26 is used by an operator or user to turn the boat 10. The remote control 28 is used by the operator to independently control the speed, the throttle and/or the trim of the propulsion unit 16. The joystick 30 is used by the operator to move the boat 10 in any direction without operating the shift, the throttle or the steering. Specifically, the joystick 30 is used to move the boat 10 forward, backward, sideways or diagonally, and to rotate in a clockwise direction or the counterclockwise direction. The controller 32 includes a microcomputer or a processor, such as a CPU (Central Processing Unit). The controller 32 can also include other conventional components such as an input interface circuit, an output interface circuit, and a memory such as a ROM (Read Only Memory) and a RAM (Random Access Memory). The processor of the controller 32 is programmed to control the various components of the boat 10. The memory of the controller 32 stores processing results and control programs such as ones for controlling the boat 10. For example, the RAM stores statuses of operational flags and various control data, while the ROM stores the control programs for various operations. It will be apparent to those skilled in the art from this disclosure that the precise structure and algorithms for the controller 32 can be any combination of hardware and software that will carry out the functions of the present invention.

In the illustrated embodiment, the controller 32 is programmed to control the propulsion units 16A and 16B in accordance with the operation signals from the steering 26, the remote control 28 and the joystick 30. The basic controls of the propulsion units 16A and 16B in accordance with the operation signals from the steering 26, the remote control 28 and the joystick 30 are relatively conventional, and thus, will not be discussed in detail herein. The controller 32 is also programmed to automatically control the at least one propulsion unit 16 based on detection results of sensors, such as a heading sensor 36 and a position sensor 38.

Specifically, the boat 10 includes the heading sensor 36 and the position sensor 38 on the deck 14. As illustrated in FIG. 2, the heading sensor 36 and the position sensor 38 are electrically connected to the controller 32 to send the detection results (e.g., the heading of the boat 10, the position of the boat 10). In response, the controller 32 operates the at least one propulsion unit 16 to control the boat 10 based on the detection results. The configuration and arrangement of the heading sensor 36 and the position sensor 38 are relatively conventional, and thus, will not be discussed in detail herein.

The heading sensor 36 basically includes an earth's magnetic field sensor, a compass or any other type of sensors that sense the heading of the boat 10. The heading sensor 36 detects the heading of the boat 10, and outputs the heading information of the boat 10 as the detection result to the controller 32.

The position sensor 38 basically includes a Global Positioning System (GPS) sensor, or any other type of Navigation Satellite System (NSS) or Global Navigation Satellite System (GNSS) sensors. Of course, the position sensor 38 can include any other type of sensors that sense the position of the boat 10. The position sensor 38 detects the position of the boat 10, and outputs the position information of the boat 10 as the detection result to the controller 32.

In the illustrated embodiment, as shown in FIG. 2, one heading sensor 36 and one position sensor 38 are provided to the boat 10. However, of course, the boat 10 can be equipped with a plurality of heading sensors and/or a plurality of position sensors for accurate and stable detection of the heading and/or the position.

In the illustrated embodiment, the controller 32 is programmed to automatically control the propulsion units 16A and 16B according to an operation mode that is set to the controller 32 from among a plurality of operation modes. These operation modes include an autopilot mode for navigating the boat 10 along a predetermined course. This autopilot mode is relatively conventional, and thus, will not be discussed in detail herein. Also, these operation modes include three station-keeping modes, such as a "stay point mode," a "fish point mode," and a "drift point mode," for example. In these station-keeping modes, the controller 32 is programmed to automatically control the propulsion units 16A and 16B to maintain the position and/or the heading (station-keeping function). These station-keeping modes will be discussed later in detail. These operation modes can be selected by operating an input means, such as a button provided to the remote control 28 and/or the joystick 30 or a touch screen (not shown) of a display of the boat control system 24.

As illustrated in FIG. 1, the propulsion units 16A and 16B (e.g., at least one propulsion unit) are movably mounted to a rear portion of the hull 12. The propulsion units 16A and 16B are laterally arranged relative to each other. Specifically, the propulsion units 16A and 16B are arranged along a lateral or widthwise direction W of the boat 10 relative to each other. The widthwise direction W of the boat 10 is perpendicular to a fore-to-aft or lengthwise direction L of the boat 10 that extends along a longitudinal center line CL of the boat 10. In the illustrated embodiment, the left side propulsion unit 16A is located laterally on the left side (port) of the boat 10 relative to the longitudinal center line CL of the boat 10, while the right side propulsion unit 16B is located laterally on the right side (starboard) relative to the longitudinal center line CL of the boat 10.

Figure 3:
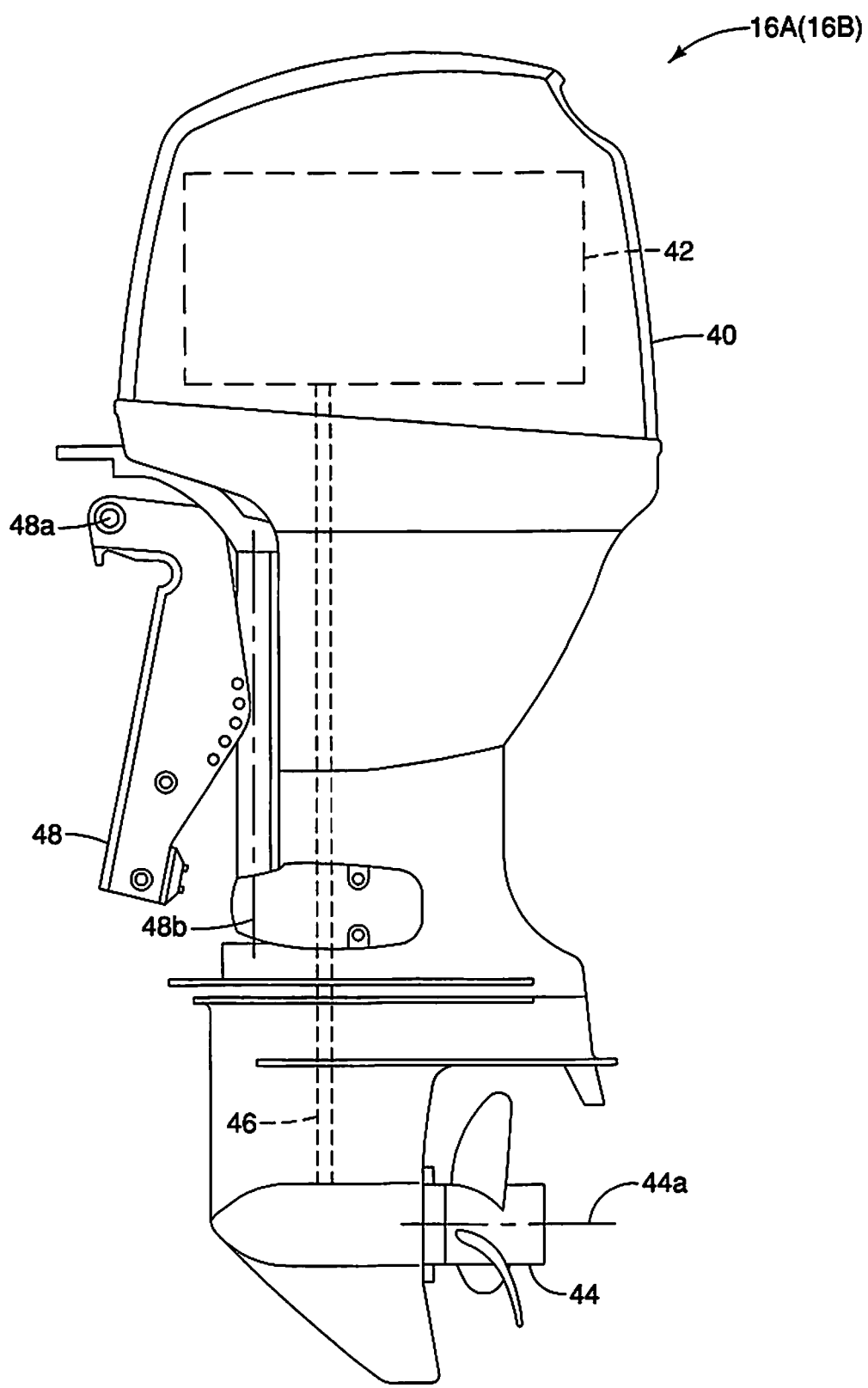
FIG. 3 is a left side elevational view of a propulsion unit of the boat illustrated in FIG. 1.

FIG. 3 is a left side elevational view of the left side propulsion unit 16A. The left side propulsion unit 16A is relatively conventional, and thus, will not be discussed in detail herein. As illustrated in FIG. 3, the left side propulsion unit 16A generally includes a cover 40, an engine 42, a propeller 44, a power transmission 46 and a bracket 48. The cover 40 accommodates the engine 42 and the power transmission 46. The propeller 44 is rotatable by a drive force transmitted from the engine 42 via the power transmission 46, and generates the propulsion force along a rotational axis 44a that defines a propulsion axis A12 (FIG. 1) of the left side propulsion unit 16A. Thus, as shown in FIG. 1, the left side propulsion unit 16A has the propulsion axis A12 along which the left side propulsion unit 16A generates the propulsion force.

The bracket 48 is a mechanism to detachably mount the left side propulsion unit 16A to the hull 12. The bracket 48 has a tilt or trim axis 48a and a pivot axis 48b. The cover 40 is pivotally coupled to the bracket 48 about the tilt axis 48a and the pivot axis 48b. Thus, the cover 40 with the engine 42, the propeller 44 and the power transmission 46 tilts relative to the bracket 48 about the tilt axis 48a, and pivots relative to the bracket 48 about the pivot axis 48b. The left side propulsion unit 16A is mounted to the hull 12 with the bracket 48 such that the tilt axis 48a extends in the widthwise direction W of the boat 10, and the pivot axis 48b extends in a vertical direction of the boat 10 that is perpendicular to the widthwise direction W and the lengthwise direction L of the boat 10. Thus, the left side propulsion unit 16A is movable upward and downward relative to the hull 12 about a tilt axis (not shown) of the boat 10, and movable leftward and rightward relative to the hull 12 about a steering axis A16 (FIG. 1) of the boat 10.

Specifically, as shown in FIG. 1, the left side propulsion unit 16A is movable about the steering axis A16 within a movable range R10 between a first end E10 and a second end E12. The first end E10 is located in a clockwise direction about the steering axis A16 relative to the second end E12. In the illustrated embodiment, the left side propulsion unit 16A is mounted to the hull 12 such that the propulsion axis A12 of the left side propulsion unit 16A extends parallel to the longitudinal center line CL of the boat 10 when the left side propulsion unit 16A is positioned at a non-turned or neutral position. Thus, a steering angle of the left side propulsion unit 16A is defined as an angle of the propulsion axis A12 relative to the longitudinal center line CL. In the illustrated embodiment, the movable range R10 is 30 degrees to the first end E10 from the non-turned position and 30 degrees to the second end E11 from the non-turned position (60 degrees in total), for example. The configuration of the lift side propulsion unit 16A is not limited to this configuration. For example, the left side propulsion unit 16A can be mounted to the hull 12 such that the propulsion axis A12 extends at an angle relative to parallel to the longitudinal center line CL of the boat 10 when the left side propulsion unit 16A is positioned at the non-turned position. Also, the movable range R10 can have a different range if needed and/or desired depending on the particular design of the boat 10.

In the illustrated embodiment, the right side propulsion unit 16B has the same configuration as the left side propulsion unit 16A, and thus, the detailed description of the right side propulsion unit 16B will be omitted for the sake of brevity. Similar to the left side propulsion unit 16A, as illustrated in FIG. 1, the right side propulsion unit 16B has a propulsion axis A14 along which the right side propulsion unit 16B generates the propulsion force. Also, the right side propulsion unit 16B is mounted to the hull 12 in the same manner as the left side propulsion unit 16A. Specifically, the right side propulsion unit 16B is movable upward and downward relative to the hull 12 about a tilt axis (not shown) of the boat 10 that extends in the widthwise direction W of the boat 10, and movable leftward and rightward relative to the hull 12 about a steering axis A18 of the boat 10.

Specifically, as shown in FIG. 1, the right side propulsion unit 16B is movable about the steering axis A18 within a movable range R12 between a first end E14 and a second end E16. The first end E14 is located in a clockwise direction about the steering axis A18 relative to the second end E16. In the illustrated embodiment, the right side propulsion unit 16B is mounted to the hull 12 such that the propulsion axis A14 of the right side propulsion unit 16B extends parallel to the longitudinal center line CL of the boat 10 when the right side propulsion unit 16B is positioned at a non-turned or neutral position. Thus, a steering angle of the right side propulsion unit 16B is defined as an angle of the propulsion axis A14 relative to the longitudinal center line CL. In the illustrated embodiment, the movable range R12 is 30 degrees to the first end E14 from the non-turned position and 30 degrees to the second end E16 from the non-turned position (60 degrees in total), for example. The configuration of the right side propulsion unit 16B is not limited to this configuration. For example, the right side propulsion unit 16B can be mounted to the hull 12 such that the propulsion axis A14 extends at an angle relative to parallel to the longitudinal center line CL of the boat 10 when the right side propulsion unit 16B is positioned at the non-turned position. Also, the movable range R12 can have a different range if needed and/or desired depending on the particular design of the boat 10.

As illustrated in FIG. 2, the propulsion units 16A and 16B are electrically connected to the controller 32. Specifically, the left side propulsion unit 16A further has an ECU (Electric Control Unit) 50, a shift actuator 52, a steering actuator 54 and a steering angle sensor 56. The ECU 50 is electrically connected to the controller 32, and controls the engine 42, the shift actuator 52, the steering actuator 54 based on control signal received from the controller 32. The ECU 50 also sends control results or detection results to the controller 32. The shift actuator 52 includes an electric cylinder or other types of actuators, for example. The shift actuator 52 switches the shift position of the power transmission 46 of the left side propulsion unit 16A to a forward position to generate a forward propulsion force, a reverse position to generate a reverse propulsion force, or a neutral position. The steering actuator 54 includes a hydraulic cylinder, or other types of actuators, for example. The steering actuator 54 turns the left side propulsion unit 16A about the steering axis A16 to change the steering angle of the left side propulsion unit 16A. The steering angle sensor 56 detects the actual steering angle of the left side propulsion unit 16A. The steering angle sensor 56 includes a stroke sensor of the hydraulic cylinder of the steering actuator 54, for example. The steering angle sensor 56 sends the detection result to the ECU 50. Also, the left side propulsion unit 16A can include a tilt actuator (not shown) to change a tilt or trim angle of the left side propulsion unit 16A.

In the illustrated embodiment, the right side propulsion unit 16B has basically the same configuration as the left side propulsion unit 16A, and thus, the detailed description of the right side propulsion unit 16B will be omitted for the sake of brevity. Thus, as illustrated in FIG. 2, the right side propulsion unit 16B also has the ECU 50, the shift actuator 52, the steering actuator 54, and the steering angle sensor 56.

With this configuration, the controller 32 is programmed to control the propulsion units 16A and 16B to independently generate the propulsion forces of the propulsion units 16A and 16B, respectively, and to independently steer or turn the propulsion units 16A and 16B about the steering axes A16 and A18, respectively, in order to propel the boat 10.

Referring now to FIGS. 4, 5, 6A, 6B, 7A, 7B, 8A and 8B, the station-keeping modes will be discussed in detail. As mentioned above, the station-keeping modes include the stay point mode, the fish point mode, and the drift point mode, for example. In the station-keeping modes, the controller 32 uses the detection results of the heading sensor 36 and the position sensor 38 to automatically control shifts (forward/reverse), throttles (propulsion forces), and steering angles of the propulsion units 16A and 16B to maintain the position and/or the heading of the boat 10. Here in the illustrated embodiment, the controller 32 controlling the shifts of the propulsion units 16A and 16B refers to the controller 32 sending control signals or commands to the ECUs 50 of the propulsion units 16A and 16B to operate the shift actuators 52 of the propulsion units 16A and 16B. Similarly in the illustrated embodiment, the controller 32 controlling the throttles of the propulsion units 16A and 16B refers to the controller 32 sending control signals or commands to the ECUs 50 of the propulsion units 16A and 16B to operate the engine 42 of the propulsion units 16A and 16B. Also in the illustrated embodiment, the controller 32 controlling the steering angles of the propulsion units 16A and 16B refers to the controller 32 sending control signals or commands to the ECUs 50 of the propulsion units 16A and 16B to operate the steering actuators 54 of the propulsion units 16A and 16B.

Figure 4:
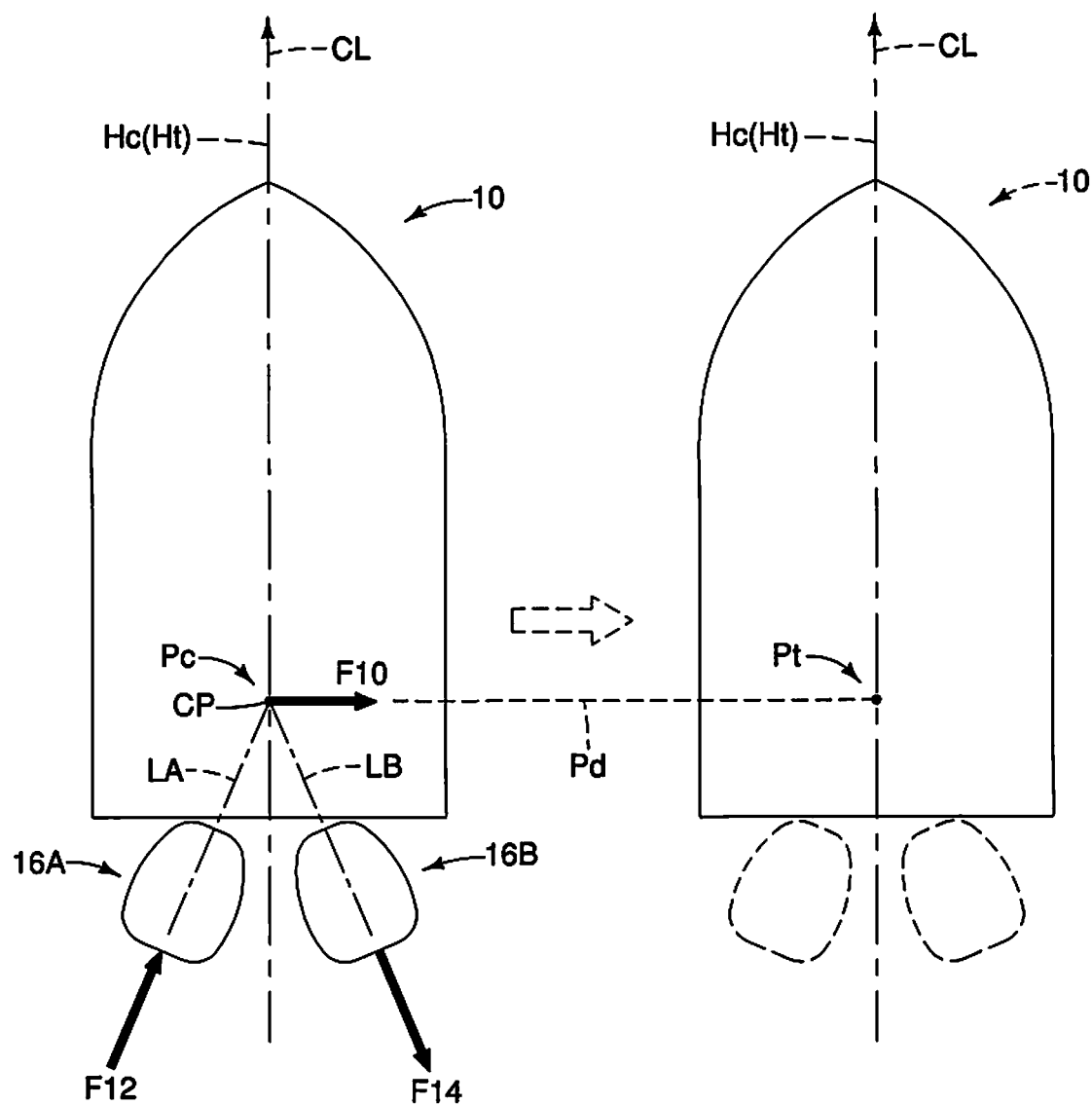
FIG. 4 is a schematic top plan view of the boat, illustrating a position control in a stay point mode to correct a position deviation of the boat.
Figure 5:
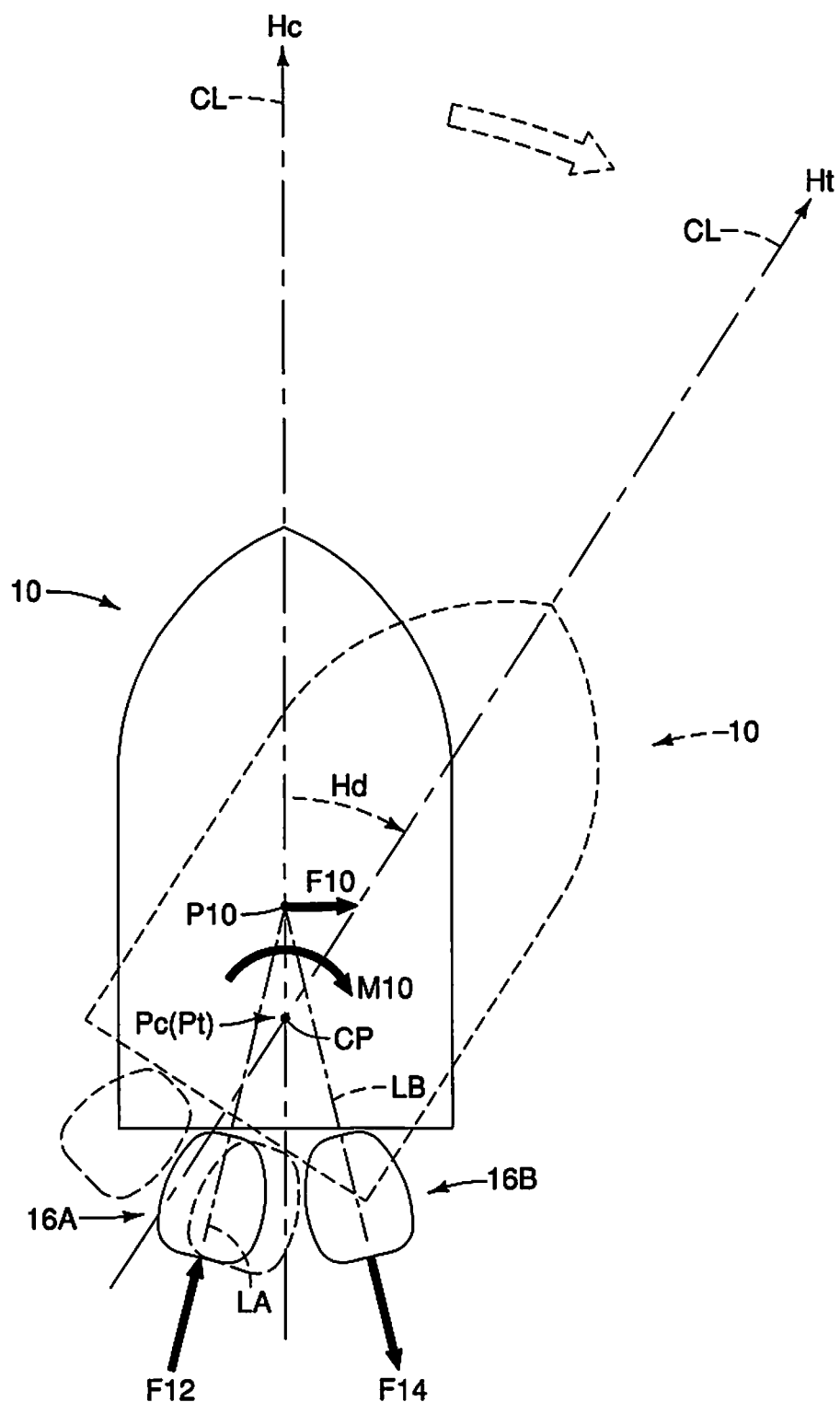
FIG. 5 is a schematic top plan view of the boat, illustrating a heading control in the stay point mode to correct a heading deviation of the boat.

The stay point mode is a mode in which the boat 10 is controlled to maintain both the position and the heading. Specifically, as shown in FIGS. 4 and 5, when the stay point mode is set to the controller 32, the controller 32 acquires a current heading He and a current position Pc of the boat 10 from the heading sensor 36 and the position sensor 38, respectively. Then, the controller 32 stores the current heading He and the current position Pc in the memory of the controller 32 as a target heading Ht and a target position Pt. Furthermore, the controller 32 continues to acquire a current heading He and a current position Pc of the boat 10 from the heading sensor 36 and the position sensor 38 at a predetermined interval. The controller 32 calculates a heading deviation Hd of the current heading Hc relative to the target heading Ht, and a position deviation Pd of the current position Pc relative to the target position Pt. The controller 32 further controls the shift, the throttle, and the steering angle of the propulsion units 16A and 16B to correct the heading deviation Hd and the position deviation Pd in a conventional manner. Specifically, the controller 32 controls the shifts, the throttles, and the steering angles of the propulsion units 16A and 16B to adjust a resultant force F10 of propulsion forces F12 and F14 of the propulsion units 16A and 16B. With this resultant force F10, the position and the heading of the boat 10 are changed to correct the heading deviation Hd and the position deviation Pd.

FIG. 4 illustrates an example of the position control to correct the position deviation Pd when the current position Pc of the boat 10 is deviated sideways (leftward in FIG. 4) relative to the target position Pt. In FIG. 4, the boat 10 before the position control is illustrated with solid lines, while the boat 10 after the position control is illustrated with dotted lines. In this case, as shown in FIG. 4, the controller 32 controls the shifts, the throttles, and the steering angles of the propulsion units 16A and 16B such that the resultant force F10 is applied sideways (rightward in FIG. 4) at a center point CP of the boat 10. More specifically, as shown in FIG. 4, the controller 32 steers both the propulsion units 16A and 16B inward (toe-in) such that the propulsion units 16A and 16B are closer to the longitudinal center line CL at the front than at the rear, and such that the line of action LA of the left side propulsion unit 16A and the line of action LB of the right side propulsion unit 16B intersects with each other at the center point CP of the boat 10. Also, the controller 32 controls the shifts and the throttles of the propulsion units 16A and 16B to generate the forward propulsion force F12 at the left side propulsion unit 16A and the reverse propulsion force F14 at the right side propulsion unit 16B that has the same magnitude as the forward propulsion force F12. Thus, the resultant force F10 is applied sideways (rightward in FIG. 4) at the center point CP of the boat 10. In the illustrated embodiment, the center point CP is located at the center of lateral resistance or resistance center of the boat 10. Thus, the resultant force F10 applied to the boat 10 merely changes the position of the boat 10 sideways (rightward in FIG. 4) without changing the heading of the boat 10 (without rotation). Also, the controller 32 can similarly change the position of the boat 10 forward, backward, sideways (leftward) or diagonally.

FIG. 5 illustrates an example of the heading control to correct the heading deviation Hd when the current heading He of the boat 10 is deviated (in the counterclockwise direction in FIG. 5) relative to the target heading Ht. In FIG. 5, the boat 10 before the heading control is illustrated with solid lines, while the boat 10 after the heading control is illustrated with dotted lines. In this case, as shown in FIG. 5, the controller 32 controls the shifts, the throttles, and the steering angles of the propulsion units 16A and 16B such that the resultant force F10 is applied to the boat 10 to generate the moment M10 (in the clockwise direction) about the center point CP of the boat 10. More specifically, as shown in FIG. 5, the controller 32 steers both the propulsion units 16A and 16B inward (toe-in) such that the line of action LA of the left side propulsion unit 16A and the line of action LB of the right side propulsion unit 16B intersects with each other at a position (application position P10) that is forward relative to the center point CP of the boat 10 along the longitudinal center line CL. Also, the controller 32 controls the shifts and the throttles of the propulsion units 16A and 16B to generate the forward propulsion force F12 at the left side propulsion unit 16A and the reverse propulsion force F14 at the right side propulsion unit 16B that has the same magnitude as the forward propulsion force F12. Thus, the resultant force F10 is applied rightward at the application position P10, which generate the moment M10 in the clockwise direction about the center point CP of the boat 10. In this case, the resultant force F10 applied to the boat 10 merely changes the heading of the boat 10 without changing the position of the boat 10 (without translation). Also, the controller 32 can similarly change the heading of the boat 10 in the counterclockwise direction.

The position control and the heading control of the controller 32 described above are merely an example, and thus, are not limited to this illustrated examples. Also, in the stay point mode, the boat 10 can be controlled differently in a conventional manner to maintain both the position and the heading.

The fish point mode is a mode in which the boat 10 is controlled to maintain only the position of the boat 10. The boat 10 can be controlled in a similar manner to the above-mentioned position control to correct the position deviation Pd in the stay point mode, as shown in FIG. 4. Thus, the position control of the controller 32 in the fish point mode will not be discussed in detail herein.

Referring now to FIGS. 6A, 6B, 7A, 7B, 8A and 8B, the drift point mode will be discussed in detail. The drift point mode is a mode in which the boat 10 is controlled to maintain only the heading of the boat 10. In particular, the drift point mode is a mode in which the boat 10 is controlled to maintain only the heading of the boat 10 while the boat 10 is drifting along water flow, wind and the like.

Figure 6A:
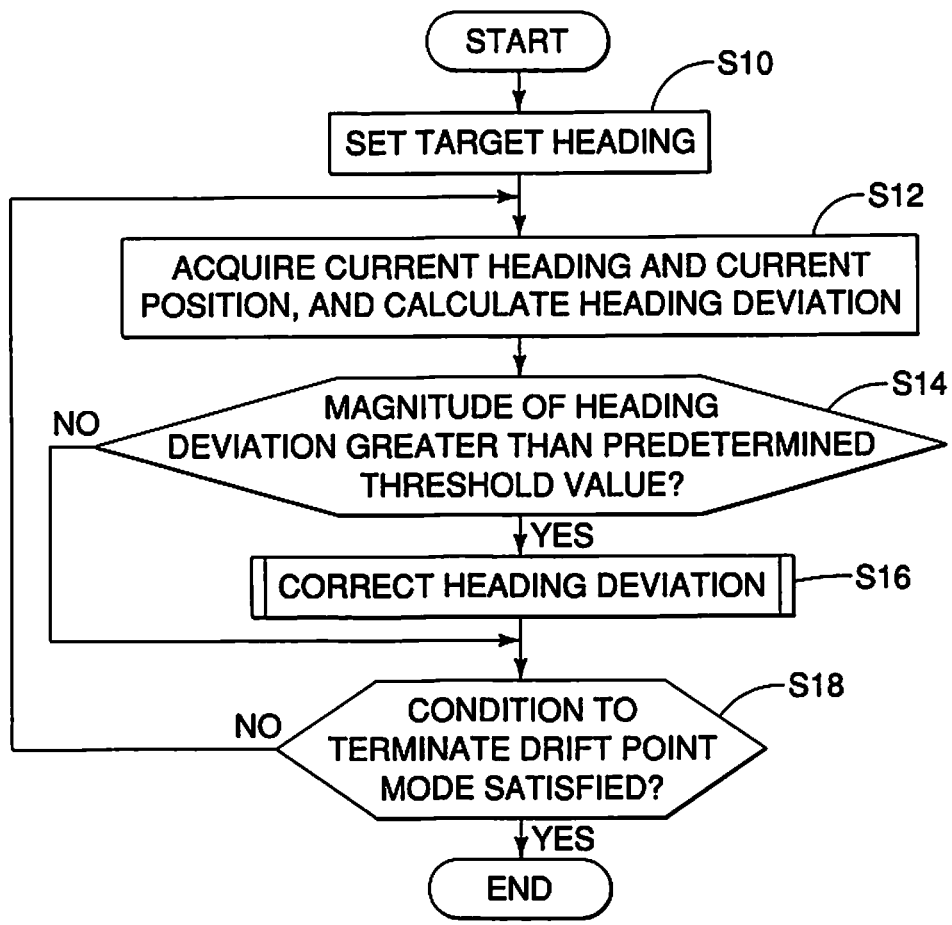
FIGS. 6A and 6B are flow charts illustrating a heading control in a drift point mode to correct a heading deviation of the boat.
Figure 6B:
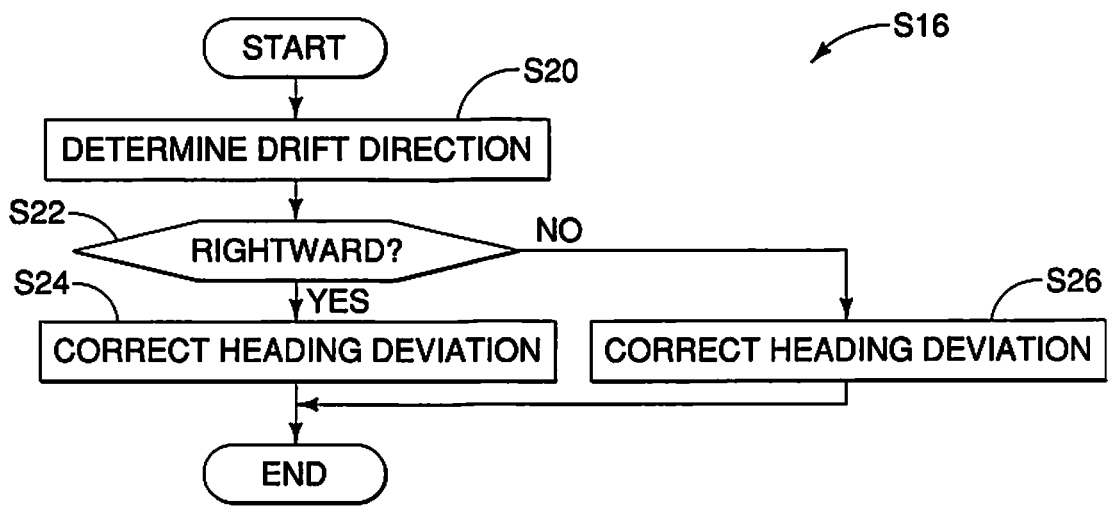

FIGS. 6A and 6B illustrate flow charts of the heading control (e.g., the heading control method) of the controller 32 in the drift point mode. The heading control method of the controller 32 in the drift point mode as shown in FIG. 6A is commenced upon selecting the drift point mode by operating an input means, such as a button provided to the remote control 28 and/or the joystick 30 or a touch screen (not shown) of a display of the boat control system 24.

In step S10, the controller 32 first set a target heading Ht in the drift point mode. Specifically, in step S10, the controller 32 acquires a current heading Hc of the boat 10 from the heading sensor 36. Then, the controller 32 stores the current heading Hc in the memory of the controller 32 as the target heading Ht, thereby setting the heading at the timing of selection of the drift point mode as the target heading Ht. Of course, the target heading Ht can be set in a different manner as needed and/or desired. For example, the target heading Ht can be manually set on the boat control system 24.

In step S12, the controller 32 acquires a current heading Hc and a current position Pc of the boat 10 from the heading sensor 36 and the position sensor 38, respectively, at a predetermined interval. Then, the controller 32 stores the current heading Hc and the current position Pc in the memory of the controller 32, or updates previously stored heading and position with the current heading Hc and the current position Pc. Thus, in step S12, the heading of the boat 10 is detected by the heading sensor 36, and the position of the boat 10 is detected by the position sensor 38. The controller 32 further calculates a heading deviation Hd of the current heading Hc relative to the target heading Ht. For example, the controller 32 calculates an angular difference (degree) between the current heading Hc and the target heading Ht as the heading deviation Hd. In the illustrated embodiment, the heading is measured or represented clockwise from the north in degrees (e.g., 0 or 360 degrees represents the north). The heading deviation Hd is calculated by subtracting the current heading Hc (degree) from the target heading Ht (degree).

In step S14, the controller 32 determines if the magnitude (or absolute value) of the heading deviation Hd is greater than a predetermined threshold value. This predetermined threshold value is preset to the controller 32. The predetermined threshold value can be set to 1 degree, 5 degrees, 10 degrees or any other value as needed and/or desired.

If the controller 32 determines that the magnitude of the heading deviation Hd is greater than the predetermined threshold value (Yes in step S14), then the process of the controller 32 proceeds to step S16 to control the shift, the throttle, and the steering angle of the propulsion units 16A and 16B to correct the heading deviation Hd. The process of the controller 32 in step S16 will be discussed in detail by referring to FIG. 6B later. After the process in step S16, the process of the controller 32 proceeds to step S18.

On the other hand, if the controller 32 determines that the magnitude of the heading deviation Hd is not greater than the predetermined threshold value (No in step S14), then the process of the controller 32 proceeds to step S18.

In step S18, the controller 32 determines if a condition to terminate the drift point mode is satisfied. If the controller 32 determines that the condition is satisfied (Yes in step S18), then the drift point mode ends. On the other hand, if the controller 32 determines that the condition is not satisfied (No in step S18), then the process of the controller 32 returns to step S12, and repeats the drift point mode. In the illustrated embodiment, the condition to terminate the drift point mode is satisfied when there is a user input to terminate the drift point mode from an input means, such as a button provided to the remote control 28 and/or the joystick 30 or a touch screen of a display of the boat control system 24, when a predetermined time period has elapsed after commencing the drift point mode, and the like.

Figure 7A:
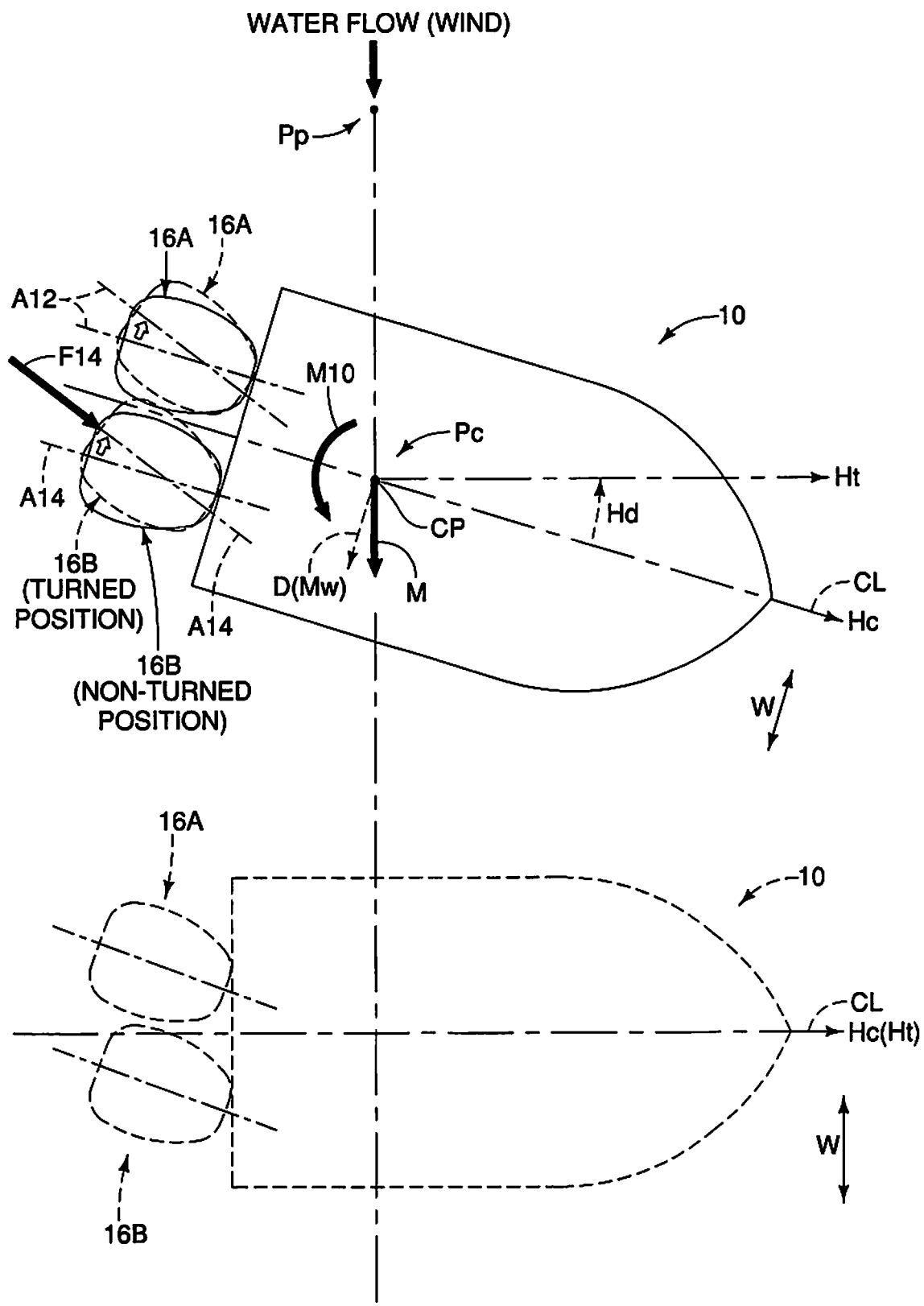
FIGS. 7A and 7B are schematic top plan views of the boat, FIG. 7A illustrating the heading control in the drift point mode while the boat is drifting rightward and a current heading is deviated in the clockwise direction relative to a target heading, FIG. 7B illustrating the heading control in the drift point mode while the boat is drifting rightward and the current heading is deviated in the counterclockwise direction relative to the target heading.
Figure 7B:
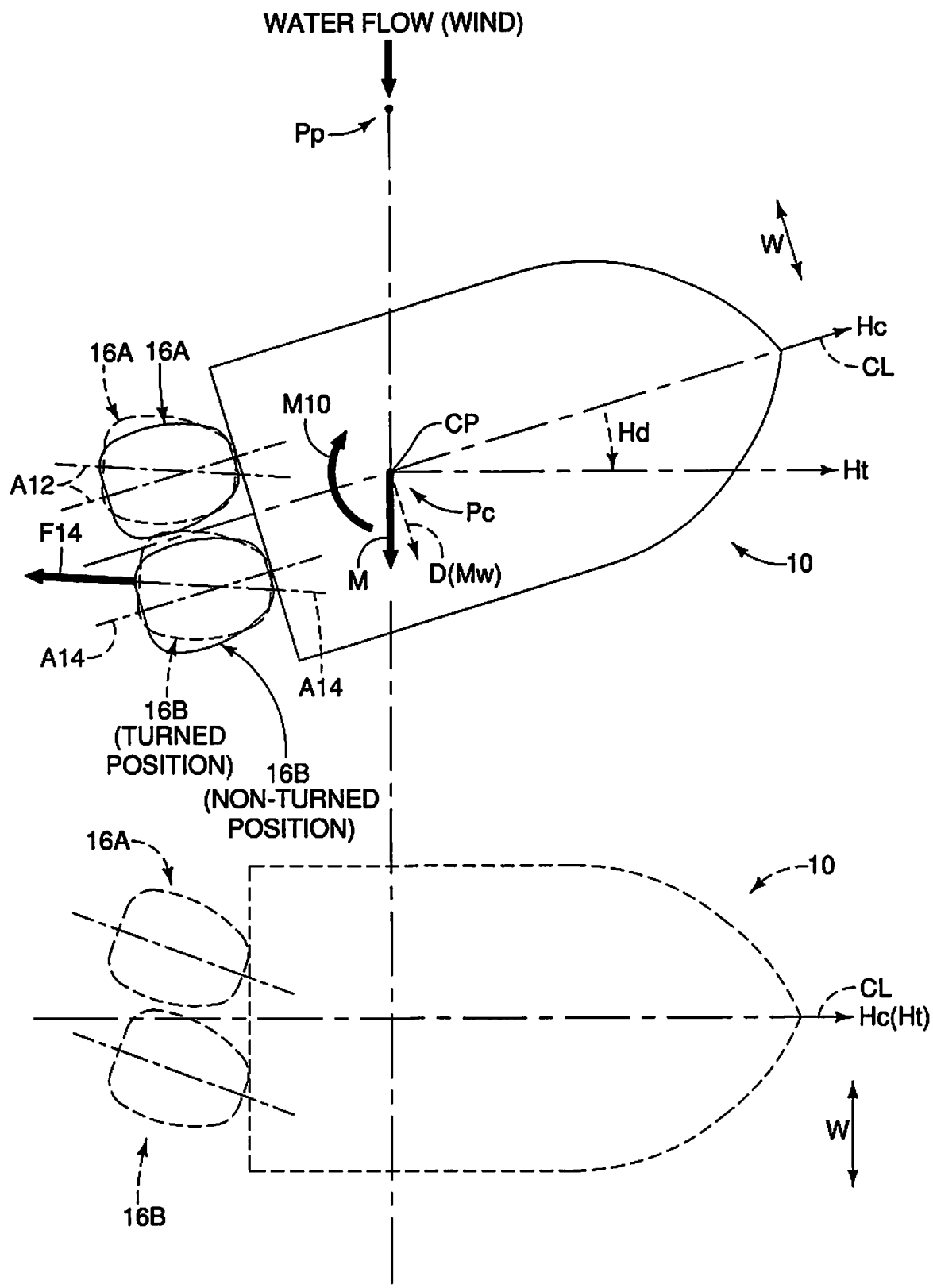
Figure 8A:
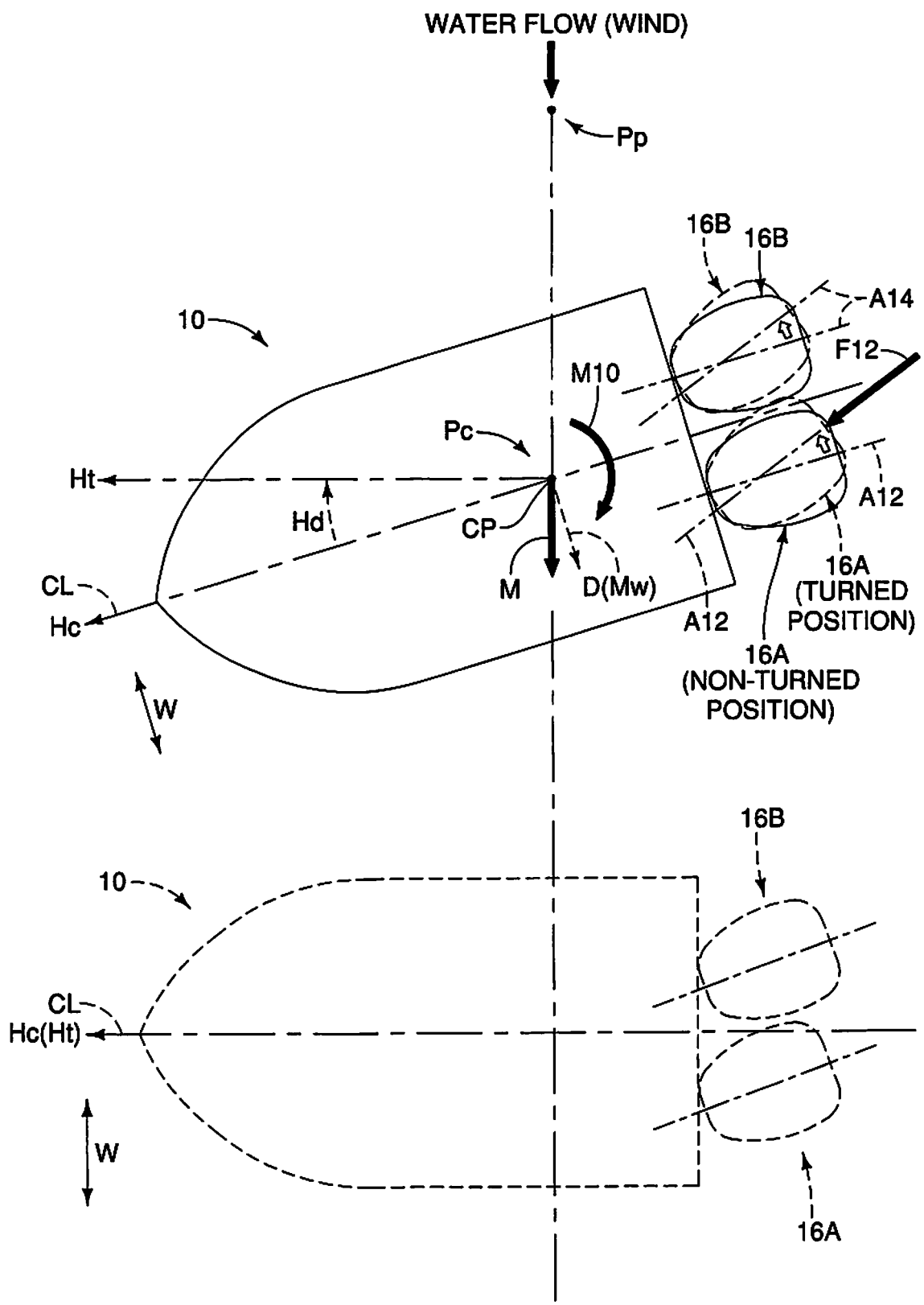
FIGS. 8A and 8B are schematic top plan views of the boat, FIG. 8A illustrating the heading control in the drift point mode while the boat is drifting leftward and the current heading is deviated in the counterclockwise direction relative to the target heading, FIG. 7B illustrating the heading control in the drift point mode while the boat is drifting leftward and the current heading is deviated in the clockwise direction relative to the target heading.
Figure 8B:
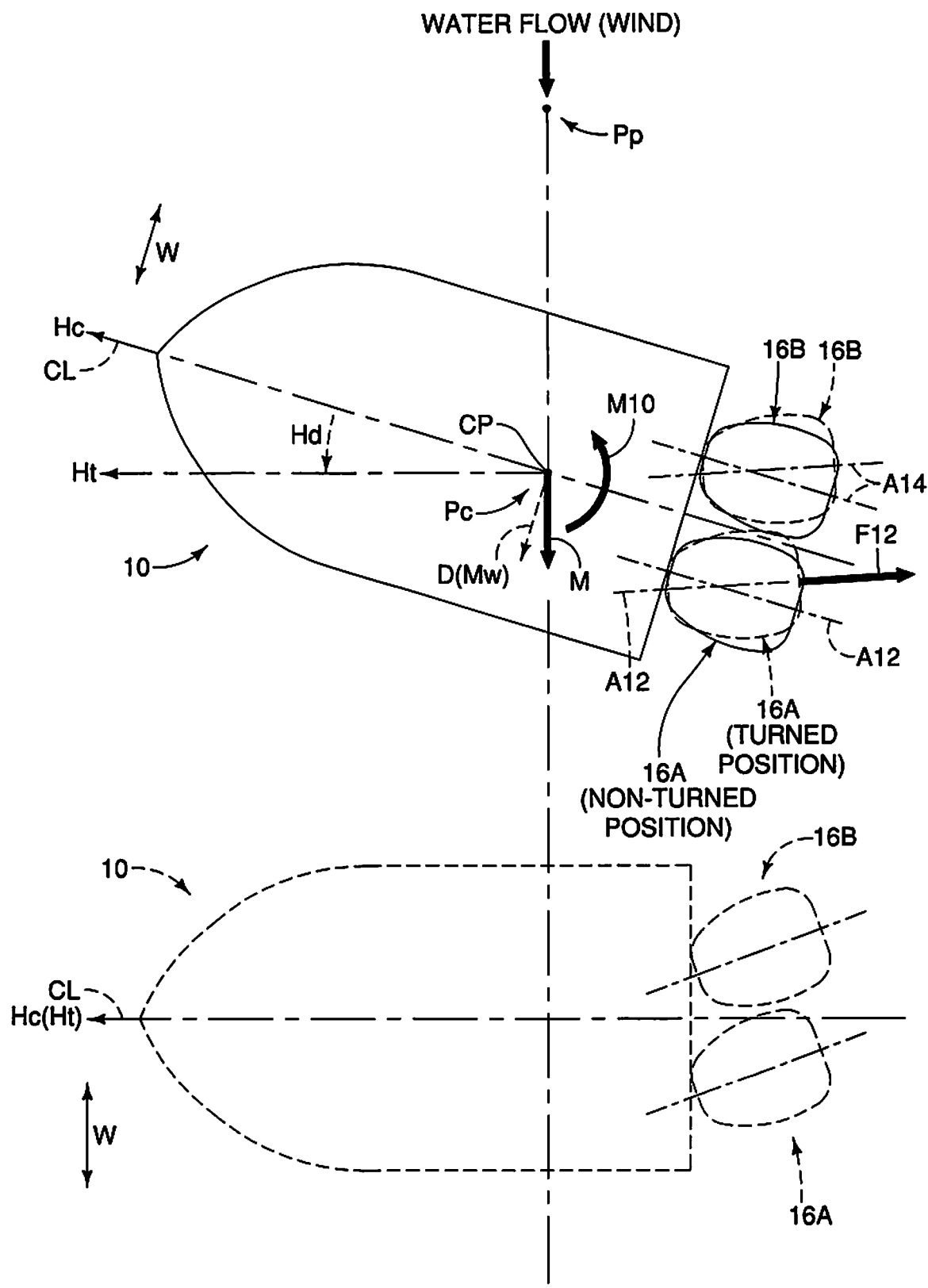

Referring now to FIGS. 6B, 7A, 7B, 8A and 8B, the process of the controller 32 in step S16 will be discussed in detail. FIGS. 7A and 7B schematically illustrate that the boat 10 is drifting rightward due to water flow and/or wind, while FIGS. 8A and 8B schematically illustrate that the boat 10 is drifting leftward due to water flow and/or wind.

In steps S20 to S26, the controller 32 controls the shift, the throttle, and the steering angle of the propulsion units 16A and 16B to correct the heading deviation Hd calculated in step S12.

In step S20, the controller 32 first determines a drift direction D of the boat 10 based on the detection results of the heading sensor 36 and the position sensor 38. In the illustrated embodiment, the drift direction D of the boat 10 is either leftward or rightward along the widthwise direction W of the boat 10 relative to the longitudinal center line CL of the boat 10. Specifically, the controller 32 determines a movement M of the boat 10 by comparing the current position Pc of the boat 10 with a previous current position Pp of the boat 10 that is stored in the memory of the controller 32 before the current position Pc is stored. Furthermore, the controller 32 determines a component Mw of the movement M of the boat 10 along the widthwise direction W of the boat 10 based on the current heading Hc of the boat 10. The controller 32 determines a direction of the component Mw along the widthwise direction W of the boat 10 (leftward or rightward) as the drift direction D of the boat 10. Of course, the drift direction D of the boat 10 can be determined in a different conventional manner as needed and/or desired. Thus, the determination of the drift direction D is not limited to this illustrated example.

In step 22, the controller 32 determines if the drift direction D of the boat 10 is rightward. If the controller 32 determines that the drift direction D of the boat 10 is rightward as illustrated in FIG. 7A or 7B (Yes in step S22), then the process proceeds to step S24. On the other hand, if the controller 32 determines that the drift direction D of the boat 10 is leftward as illustrated in FIG. 8A or 8B (No in step S22), then the process proceeds to step S26. After the process in step S24 or in step S26, the process returns to step S18 in FIG. 6A.

Referring further to FIGS. 7A, 7B, 8A and 8B, the processes in steps S24 and S26 will be discussed in detail.

In step S24, as illustrated in FIGS. 7A and 7B, the controller 32 controls the shift, the throttle, and the steering angle of the propulsion units 16A and 16B to correct the heading deviation Hd calculated in step S12 while the boat 10 is drifting rightward. In FIGS. 7A and 7B, the boat 10 before the heading control is illustrated with solid lines, while the boat 10 after the heading control is illustrated with dotted lines. As illustrated in FIGS. 7A and 7B, the boat 10 is drifted along water flow and/or wind while performing the heading control.

Specifically, in step S24, the controller 32 is programmed to turn or steer the right side propulsion unit 16B relative to the hull 12 such that the propulsion axis A14 of the right side propulsion unit 16B moves away from the center point CP of the boat 10 to correct or reduce the heading deviation Hd of the boat 10. In particular, as illustrated in FIGS. 7A and 7B, the controller 32 steers the right side propulsion unit 16B in the clockwise direction. In other words, the controller 32 steers the right side propulsion unit 16B outward (toe-out) relative to the propulsion axis A14 of the right side propulsion unit 16B that is positioned at the non-turned or neutral position. As mentioned above, in the illustrated embodiment, the propulsion axis A14 of the right side propulsion unit 16B extends parallel to the longitudinal center line CL of the boat 10 when the right side propulsion unit 16B is positioned at the non-turned or neutral position. Thus, in step S24, the controller 32 steers the right side propulsion unit 16B such that the propulsion axis A14 moves away from the longitudinal center line CL as moving forward in the lengthwise direction L.

In the illustrated embodiment, the controller 32 is programmed to fully turn the right side propulsion unit 16B relative to the hull 12 to the first end E14 of the movable range R12 of the right side propulsion unit 16B. As mentioned above, the movable range R12 is 30 degrees to the first end E14 from the non-turned position. Thus, the controller 32 turns the right side propulsion unit 16B by 30 degrees from the non-turned position in the clockwise direction. However, the present invention is not limited to this configuration, and the right side propulsion unit 16B can be steered by a predetermined angle within the movable range R12.

In the illustrated embodiment, in step S24, the controller 32 is programmed to turn the propulsion units 16A and 16B in the same direction. In particular, as shown in FIGS. 7A and 7B, the controller 32 also fully turns the left side propulsion unit 16A to the first end E10 of the movable range R10 of the left side propulsion unit 16A. As mentioned above, the movable range R10 is 30 degrees to the first end E10 from the non-turned position. Thus, the controller 32 turns the left side propulsion unit 16A by 30 degrees from the non-turned position in the clockwise direction. However, the present invention is not limited to this configuration. The left side propulsion unit 16A can be steered by a predetermined angle within the movable range R10. Also, the left side propulsion unit 16A can be non-steered or non-turned while the right side propulsion unit 16B is steered in step S24.

In step S24, the controller 32 is programmed to drive only the right side propulsion unit 16B to generate one of the forward propulsion force and the reverse propulsion force to reduce the heading deviation Hd of the boat 10. In other words, the left side propulsion unit 16A does not generate any propulsion forces while correcting the heading deviation Hd and the boat 10 is drifting rightward (the drift direction). Specifically, as shown in FIG. 7A, if the target heading Ht is located in the counterclockwise direction relative to the current heading Hc, then the controller 32 drives the right side propulsion unit 16B to generate the forward propulsion force F14. As shown in FIG. 7A, this forward propulsion force F14 of the right side propulsion unit 16B generates the moment M10 in the counterclockwise direction about the center point CP of the boat 10. This reduces the heading deviation Hd of the boat 10. On the other hand, as shown in FIG. 7B, if the target heading Ht is located in the clockwise direction relative to the current heading Hc, then the controller 32 drives the right side propulsion unit 16B to generate the reverse propulsion force F14. As shown in FIG. 7B, this reverse propulsion force F14 of the right side propulsion unit 16B generates the moment M10 in the clockwise direction about the center point CP of the boat 10. This reduces the heading deviation Hd of the boat 10.

In step S24, the controller 32 can be programmed to control the throttle of the right side propulsion unit 16B according to the heading deviation Hd. Specifically, the controller 32 can control the right side propulsion unit 16B to increase the propulsion force F14 as the magnitude of the heading deviation Hd increases. In this case, the controller 32 can control the throttle of the right side propulsion unit 16B based on a predetermined relationship between the heading deviation Hd and the magnitude of the propulsion force F14 and/or the duration to generate the propulsion force F14. Of course, the present invention is not limited to this configuration, and the controller 32 can control the right side propulsion unit 16B to generate the same propulsion force regardless of the magnitude of the heading deviation Hd, for example. Also, in step S24, the controller 32 can control the right side propulsion unit 16B using a feedback control by obtaining the current heading Hc to adjust the heading deviation Hd to zero.

As mentioned above, after the process in step S24, the process returns to step S18 in FIG. 6A.

Similarly, in step S26, as illustrated in FIGS. 8A and 8B, the controller 32 controls the shift, the throttle, and the steering angle of the propulsion units 16A and 16B to correct the heading deviation Hd calculated in step S12 while the boat 10 is drifting leftward. In FIGS. 8A and 8B, the boat 10 before the heading control is illustrated with solid lines, while the boat 10 after the heading control is illustrated with dotted lines. As illustrated in FIGS. 8A and 8B, the boat 10 is drifted along water flow and/or wind while performing the heading control.

Specifically, in step S26, the controller 32 is programmed to turn or steer the left side propulsion unit 16A relative to the hull 12 such that the propulsion axis A12 of the left side propulsion unit 16A moves away from the center point CP of the boat 10 to correct or reduce the heading deviation Hd of the boat 10. In particular, as illustrated in FIGS. 8A and 8B, the controller 32 steers the left side propulsion unit 16A in the counterclockwise direction. In other words, the controller 32 steers the left side propulsion unit 16A outward (toe-out) relative to the propulsion axis A12 of the left side propulsion unit 16A that is positioned at the non-turned or neutral position. As mentioned above, in the illustrated embodiment, the propulsion axis A12 of the left side propulsion unit 16A extends parallel to the longitudinal center line CL of the boat 10 when the left side propulsion unit 16A is positioned at the non-turned or neutral position. Thus, in step S26, the controller 32 steers the left side propulsion unit 16A such that the propulsion axis A12 moves away from the longitudinal center line CL as moving forward in the lengthwise direction L.

In the illustrated embodiment, the controller 32 is programmed to fully turn the left side propulsion unit 16A relative to the hull 12 to the second end E12 of the movable range R10 of the left side propulsion unit 16A. As mentioned above, the movable range R10 is 30 degrees to the second end E12 from the non-turned position. Thus, the controller 32 turns the left side propulsion unit 16A by 30 degrees from the non-turned position in the counterclockwise direction. However, the present invention is not limited to this configuration, and the left side propulsion unit 16A can be steered by a predetermined angle within the movable range R10.

In the illustrated embodiment, in step S26, the controller 32 is programmed to turn the propulsion units 16A and 16B in the same direction. In particular, as shown in FIGS. 8A and 8B, the controller 32 also fully turns the right side propulsion unit 16B to the second end E16 of the movable range R12 of the right side propulsion unit 16B. As mentioned above, the movable range R12 is 30 degrees to the second end E16 from the non-turned position. Thus, the controller 32 turns the right side propulsion unit 16B by 30 degrees from the non-turned position in the counterclockwise direction. However, the present invention is not limited to this configuration. The right side propulsion unit 16B can be steered by a predetermined angle within the movable range R12. Also, the right side propulsion unit 16B can be non-steered or non-turned while the left side propulsion unit 16A is steered in step S26.

In step S26, the controller 32 is programmed to drive only the left side propulsion unit 16A to generate one of the forward propulsion force and the reverse propulsion force to reduce the heading deviation Hd of the boat 10. In other words, the right side propulsion unit 16B does not generate any propulsion forces while correcting the heading deviation Hd and the boat 10 is drifting leftward (the drift direction). Specifically, as shown in FIG. 8A, if the target heading Ht is located in the clockwise direction relative to the current heading Hc, then the controller 32 drives the left side propulsion unit 16A to generate the forward propulsion force F12. As shown in FIG. 8A, this forward propulsion force F14 of the left side propulsion unit 16A generates the moment M10 in the clockwise direction about the center point CP of the boat 10. This reduces the heading deviation Hd of the boat 10. On the other hand, as shown in FIG. 8B, if the target heading Ht is located in the counterclockwise direction relative to the current heading Hc, then the controller 32 drives the left side propulsion unit 16A to generate the reverse propulsion force F12. As shown in FIG. 8B, this reverse propulsion force F12 of the left side propulsion unit 16A generates the moment M10 in the counterclockwise direction about the center point CP of the boat 10. This reduces the heading deviation Hd of the boat 10.

In step S26, the controller 32 can be programmed to control the throttle of the left side propulsion unit 16A according to the heading deviation Hd. Specifically, the controller 32 can control the left side propulsion unit 16A to increase the propulsion force F12 as the magnitude of the heading deviation Hd increases. In this case, the controller 32 can control the throttle of the left side propulsion unit 16A based on a predetermined relationship between the heading deviation Hd and the magnitude of the propulsion force F12 and/or the duration to generate the propulsion force F12. Of course, the present invention is not limited to this configuration, and the controller 32 can control the left side propulsion unit 16A to generate the same propulsion force regardless of the magnitude of the heading deviation Hd, for example. Also, in step S26, the controller 32 can control the left side propulsion unit 16A using a feedback control by obtaining the current heading Hc to adjust the heading deviation Hd to zero.

As mentioned above, after the process in step S26, the process returns to step S18 in FIG. 6A.

Figure 9A:
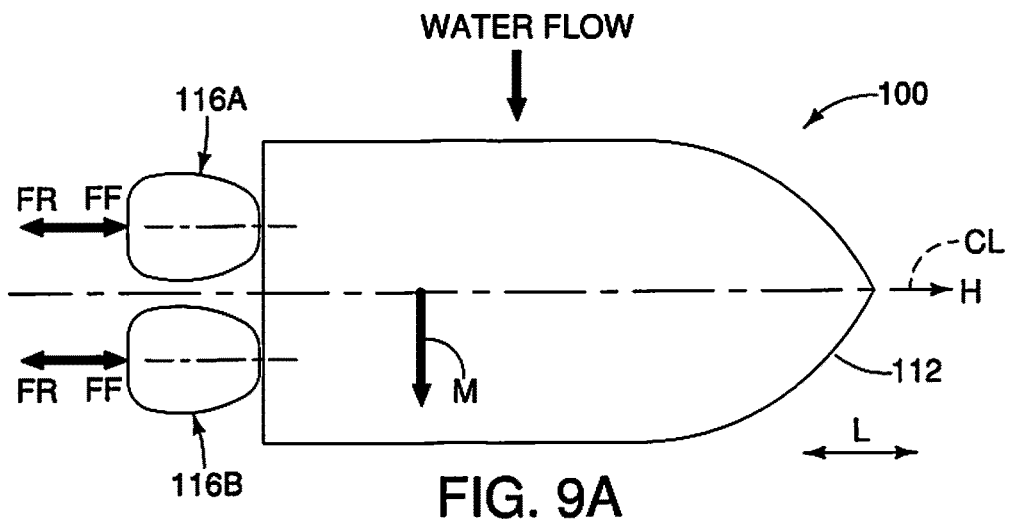
FIGS. 9A, 9B and 9C are schematic top plan views of a boat in accordance with a comparative example, illustrating a heading control while the boat is drifting.
Figure 9B:
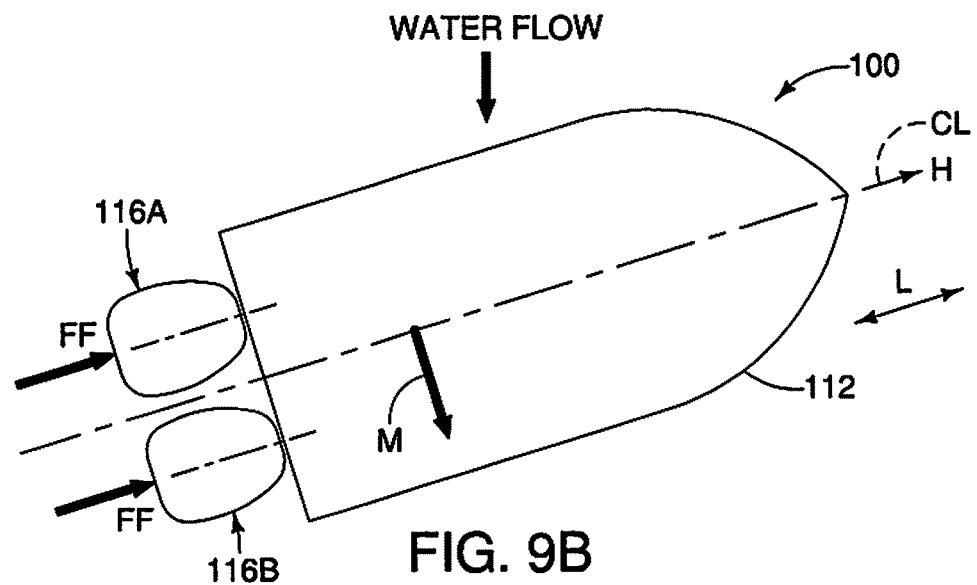
Figure 9C:
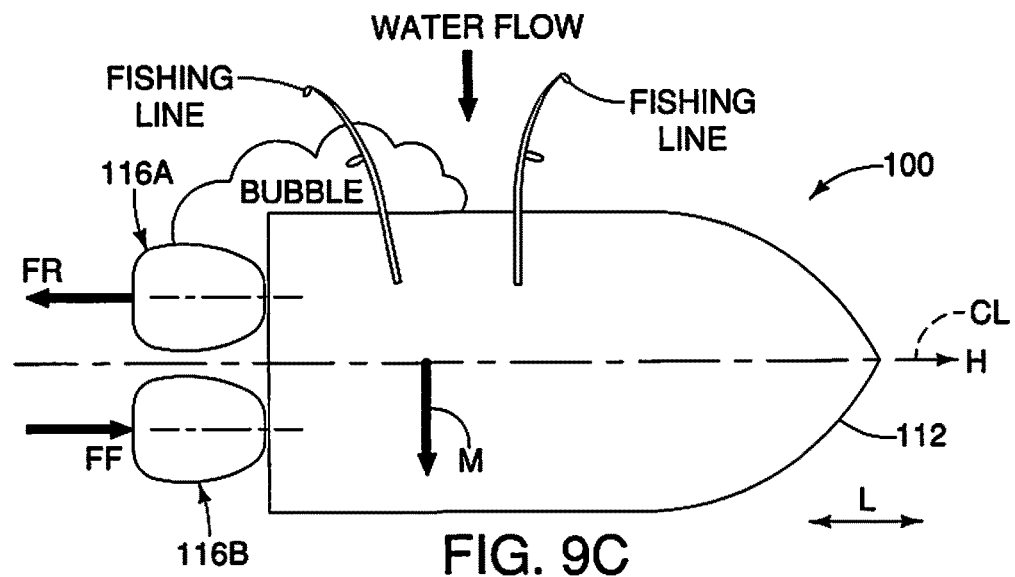

Referring now to FIGS. 9A, 9B and 9C, a comparative example of a heading control of a boat 100 in a drift point mode will be described. As illustrated in FIG. 9A, the boat 100 of the comparative example sets the steering of propulsion units 116A and 116B straight while the boat 100 is drifting in a drift direction (rightward in FIG. 9A) in the drift point mode.

The boat 100 adjusts the heading H of the boat 100 by using one of the propulsion units 116A and 116B when a heading deviation of a current heading relative to a target heading is small. In particular, the boat 100 measures the boat speed of the boat 100 in a front-to-aft or lengthwise direction L of the boat 100 along a longitudinal center line CL of the boat 100, and adjusts the heading H of the boat 100 by operating one of the propulsion units 116A and 116B based on the boat speed of the boat 100. For example, the boat 100 adjusts the heading H by operating one of the propulsion units 116A and 116B to generate a reverse propulsion force FR when the boat 100 moves forward in the lengthwise direction L. On the other hand, the boat 100 adjusts the heading H by operating one of the propulsion units 116A and 116B to generate a forward propulsion force FF when the boat 100 moves backward in the lengthwise direction L.

The boat 100 also adjusts the heading H of the boat 100 by using both of the propulsion units 116A and 116B when the heading deviation is large. In particular, the boat 100 adjusts the heading H by operating one of the propulsion units 116A and 116B to generate the reverse propulsion force FR and by operating the other one of the propulsion units 116A and 116B to generate the forward propulsion force FF.

With this heading control of the boat 100, the boat 100 can be drifted by the water flow in a moving direction M that is parallel to a direction of the water flow when the heading H (target heading) is directing perpendicular to the direction of the water flow, as illustrated in FIG. 9A.

On the other hand, as illustrated in FIG. 9B, with the above-mentioned heading control of the boat 100, it is difficult that the boat 100 is drifted along the direction of the water flow when the heading H (target heading) is directing at an angle relative to the direction of the water flow. For example, when the heading H is directing diagonally against the water flow, as illustrated in FIG. 9B, the measured boat speed of the boat 100 indicates that the boat 100 moves backwards in the lengthwise direction L. In this case, as mentioned above, the boat 100 adjusts the heading H of the boat 100 by operating one of the propulsion units 116A and 116B to mostly generate the forward propulsion force FF. As a result, the boat 100 is drifted in a moving direction M at an angle relative to the direction of the water flow, not along the direction of the water flow, due to the forward propulsion force FF applied to the boat 100, as illustrated in FIG. 9B.

Furthermore, as illustrated in FIG. 9C, the drift point mode is basically used for fishing while the boat 100 is drifting along the water flow. When the boat 100 is drifting rightward as illustrated in FIG. 9C, it is desirable to fish from the port side (left side) of the boat 100. However, with the above-mentioned heading control of the boat 100, the propulsion unit 116A on the port side can be used to generate the propulsion force to correct the heading H of the boat 100. For example, the propulsion unit 116A can be operated to generate the reverse propulsion force FR, as illustrated in FIG. 9C. This reverse propulsion force FR of the propulsion unit 116A on the port side causes water flow and/or bubble on the port side of the boat 100, as illustrated in FIG. 9C. As a result, the water flow and/or the bubble caused by the reverse propulsion force FR of the propulsion unit 116A adversely affects the fishing lines and interrupts the fishing.

On the other hand, with the boat 10 in accordance with the illustrated embodiment, as illustrated in FIGS. 7A, 7B, 8A and 8B, the controller 32 is programmed to drive only one of the propulsion units 16A and 16B that is located laterally in the drift direction D of the boat 10 relative to the longitudinal center line CL of the boat 10 to generate one of the forward propulsion force and the reverse propulsion force to correct the heading of the boat 10 upon determining the boat 10 is drifting in the drift direction D based on the detection results of the heading sensor 36 and the position sensor 38. In particular, when the boat 10 is drifting rightward, then the heading of the boat 10 is adjusted by operating only the right side propulsion unit 16B to generate the forward propulsion force F14 or the reverse propulsion force F14. Also, when the boat 10 is drifting leftward, then the heading of the boat 10 is adjusted by operating only the left side propulsion unit 16A to generate the forward propulsion force F12 or the reverse propulsion force F12. Since only one of the propulsion units 16A and 16B generates the forward propulsion force or the reverse propulsion force to correct the heading of the boat 10, the effects of the forward propulsion force and the reverse propulsion force to the position of the boat 10 can be mostly canceled out. Thus, the boat 10 can be drifted in the same direction or in generally the same direction as the direction of the water flow or the wind. Therefore, it can be prevented that the boat 10 drifts in a moving direction at an angle relative to the direction of the water flow, as the boat 100 in accordance with the comparative example illustrated in FIG. 9B.

Furthermore, with the boat 10 in accordance with the illustrated embodiment, as illustrated in FIGS. 7A and 7B, when the boat 10 is drifting rightward, only the right side propulsion unit 16B generates the forward propulsion force F14 or the reverse propulsion force 14 to correct the heading of the boat 10, and the left side propulsion unit 16A does not generate any propulsion forces. Also, as illustrated in FIGS. 8A and 8B, when the boat 10 is drifting leftward, only the left side propulsion unit 16A generates the forward propulsion force F12 or the reverse propulsion force F12 to correct the heading of the boat 10, and the right side propulsion unit 16B does not generate any propulsion forces. Thus, the propulsion force F12 or F14 is generated by one of the propulsion units 16A and 16B that is located closest to the side of the boat 10 to which the boat 10 is drifting. Thus, the propulsion force F12 or F14 does not cause the water flow or the bubble on the other side of the boat 10 that is opposite to the side to which the boat 10 is drifting. Thus, many people can enjoy fishing from one side of the boat 10 without being interrupted by the water flow or the bubble from the propulsion units 16A and 16B while the boat 10 is drifting.

Also, with the boat 10 in accordance with the illustrated embodiment, as illustrated in FIGS. 7A and 7B, the controller 32 is programmed to fully turn the right side propulsion unit 16B relative to the hull 12 to the first end E14 of the movable range R12 of the right side propulsion unit 16B while correcting the heading of the boat 10 and the boat 10 is drifting rightward. Also, as illustrated in FIGS. 8A and 8B, the controller 32 is programmed to fully turn the left side propulsion unit 16A relative to the hull 12 to the second end E12 of the movable range R10 of the left side propulsion unit 16A while correcting the heading of the boat 10 and the boat 10 is drifting leftward. Thus, the distance from the center point CP of the boat 10 to the propulsion axis A14 of the right side propulsion unit 16B or to the propulsion axis A12 of the left side propulsion unit 16A can be made larger, which makes the moment M10 about the center point CP of the boat 10 applied to the boat 10 larger. Thus, the heading control of the boat 10 can be promptly performed.

The present invention is not limited the illustrated embodiment described above, and it is also possible to make various modifications.

In the illustrated embodiment, the boat 10 has a twin outboard motor configuration (the left side propulsion unit 16A and the right side propulsion unit 16B). However, as mentioned above, the configuration of the propulsion unit for the boat 10 is not limited to this configuration.

Figure 10A:
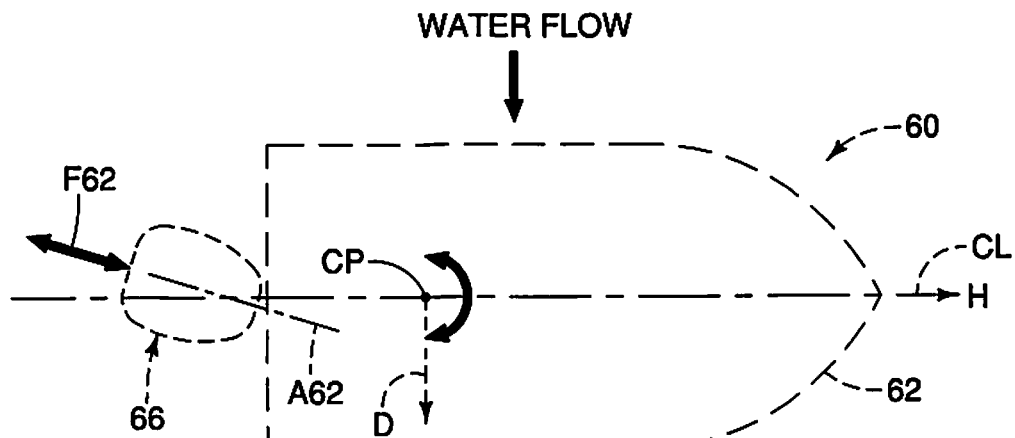
FIG. 10A, 10B and 10C are schematic top plan views of boats in accordance with a modified embodiments, FIG. 10A illustrating a single outboard motor configuration, FIG. 10B illustrating a triple outboard motor configuration, and FIG. 10C illustrating a quadruple outboard motor configuration.

FIG. 10A illustrates a boat 60 with a single outboard motor configuration in accordance with a modified embodiment. The boat 60 is basically identical to the boat 10 illustrated in FIG. 1, except that the boat 60 has only one propulsion unit 66. Although not shown in FIG. 10A, the boat 60 has a heading sensor, a position sensor, and a controller that are basically the same as the heading sensor 36, the position sensor 38, and the controller 32 of the boat 10 illustrated in FIGS. 1 and 2. Also, with the boat 60 in accordance with this modified embodiment, the above-mentioned drift point mode can also be performed.

Specifically, the controller of the boat 60 is programmed to turn the propulsion unit 66 relative to a hull 62 such that a propulsion axis A62 of the propulsion unit 66 moves away from the center point CP of the boat 60 and towards a drift direction D while correcting the heading of the boat 60 and the boat 60 is drifting in the drift direction D. For example, as shown in FIG. 10A, the controller of the boat 60 is programmed to turn the propulsion unit 66 in the clockwise direction such that the propulsion axis A62 of the propulsion unit 66 moves away from the center point CP of the boat 60 and rightward (the drift direction) while correcting the heading of the boat 60 and the boat 60 is drifting rightward.

The controller of the boat 60 is programmed to fully turn the propulsion unit 66 relative to the hull 62 to an end of a movable range of the propulsion unit 66 while correcting the heading of the boat 60 and the boat 60 is drifting in the drift direction D (rightward in FIG. 10A). The controller of the boat 60 is programmed to drive the propulsion unit 66 to generate one of the forward propulsion force F62 and the reverse propulsion force F62 while correcting the heading of the boat 60 and the boat 60 is drifting in the drift direction D (rightward in FIG. 10A). Also, the controller of the boat 60 is programmed to determine the drift direction D based on the detection results of a heading sensor and a position sensor, in the same manner as the controller 32 of the boat 10.

Figure 10B:
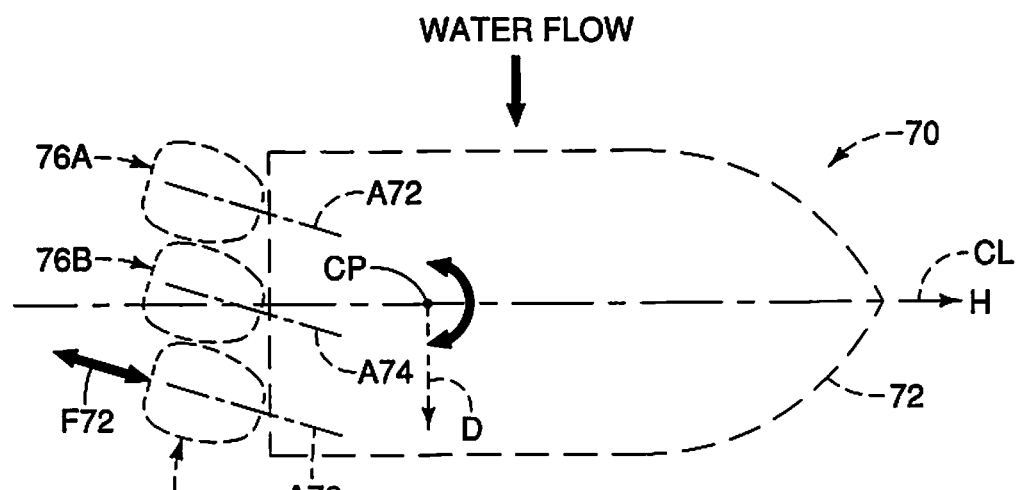

FIG. 10B illustrates a boat 70 with a triple outboard motor configuration in accordance with another modified embodiment. The boat 70 is basically identical to the boat 10 illustrated in FIG. 1, except that the boat 70 has three propulsion units, such as a left side propulsion unit 76A, a middle propulsion unit 76B and a right side propulsion unit 76C. As illustrated in FIG. 10B, the left side propulsion unit 76A has a propulsion axis A72, the middle propulsion unit 76B has a propulsion axis A74, and the right side propulsion unit 76C has a propulsion axis A76. Although not shown in FIG. 10B, the boat 70 has a heading sensor, a position sensor, and a controller that are basically the same as the heading sensor 36, the position sensor 38, and the controller 32 of the boat 10 illustrated in FIGS. 1 and 2. With the boat 70 in accordance with this modified embodiment, the above-mentioned drift point mode can also be performed.

Specifically, the controller of the boat 70 is programmed to turn one of the propulsion units 76A, 76B and 76C while correcting the heading of the boat 70 and the boat 70 is drifting in the drift direction D. The one of the propulsion units 76A, 76B and 76C is located laterally in the drift direction D relative to the longitudinal center line CL of the boat 70 relative to a hull 72. Also, the one of the propulsion units 76A, 76B and 76C is located laterally farthest from the longitudinal center line CL of the boat 70 in the drift direction D. Specifically, when the boat 70 is drifting rightward, as illustrated in FIG. 10B, the controller of the boat 70 is programmed to turn the right side propulsion unit 76C such that the propulsion axis A76 of the right side propulsion unit 76C moves away from the center point CP of the boat 70 in the clockwise direction. Also, in this case, the controller of the boat 70 is programmed to drive only the right side propulsion unit 76C to generate one of the forward propulsion force F72 and the reverse propulsion force F72, as illustrated in FIG. 10B. On the other hand, when the boat 70 is drifting leftward, the controller of the boat 70 is programmed to turn the left side propulsion unit 76A such that the propulsion axis A72 of the left side propulsion unit 76A moves away from the center point CP of the boat 70 in the counterclockwise direction. Also, in this case, the controller of the boat 70 is programmed to drive only the left side propulsion unit 76A to generate one of the forward propulsion force and the reverse propulsion force.

Also, the controller of the boat 70 is programmed to fully turn the right side propulsion unit 76C relative to the hull 72 to an end of a movable range of the right side propulsion unit 76C while correcting the heading of the boat 70 and the boat 70 is drifting rightward. On the other hand, the controller of the boat 70 is programmed to fully turn the left side propulsion unit 76A relative to the hull 72 to an end of a movable range of the left side propulsion unit 76A while correcting the heading of the boat 70 and the boat 70 is drifting leftward.

Also, the controller of the boat 70 is programmed to turn the left side propulsion unit 76A, the middle propulsion unit 76B and the right side propulsion unit 76C in the same direction (in the clockwise direction in FIG. 10B) while correcting the heading of the boat 70 and the boat 70 is drifting in the drift direction D (rightward in FIG. 10B).

Figure 10C:
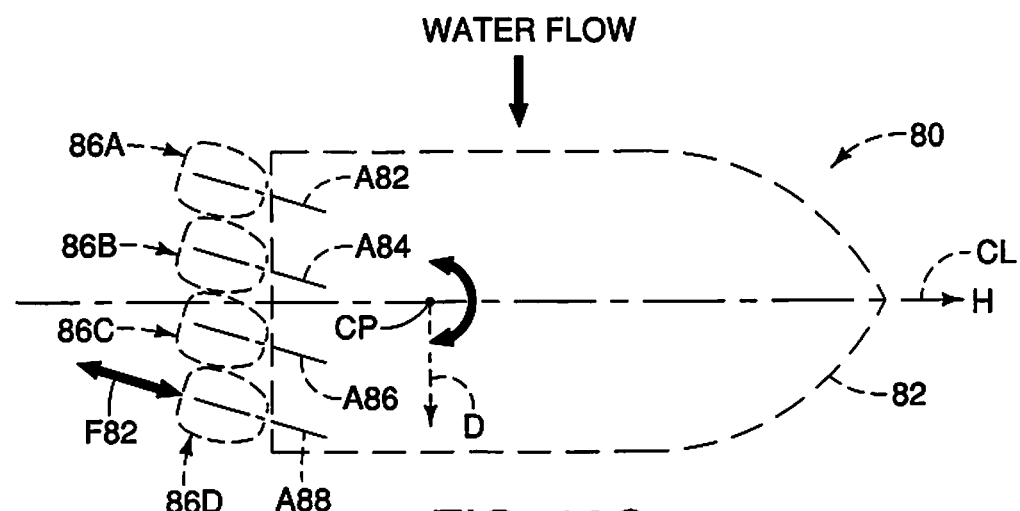

FIG. 10C illustrates a boat 80 with a quadruple outboard motor configuration in accordance with another modified embodiment. The boat 80 is basically identical to the boat 10 illustrated in FIG. 1, except that the boat 80 has four propulsion units, such as an outer left side propulsion unit 86A, an inner left side propulsion unit 86B, an inner right side propulsion unit 86C, and an outer right side propulsion unit 86D. As illustrated in FIG. 10C, the outer left side propulsion unit 86A has a propulsion axis A82, the inner left side propulsion unit 86B has a propulsion axis A84, the inner right side propulsion unit 86C has a propulsion axis A86, and the outer right side propulsion unit 86D has a propulsion axis A88. Although not shown in FIG. 10C, the boat 80 has a heading sensor, a position sensor, and a controller that are basically the same as the heading sensor 36, the position sensor 38, and the controller 32 of the boat 10 illustrated in FIGS. 1 and 2. With the boat 80 in accordance with this modified embodiment, the above-mentioned drift point mode can also be performed.

Specifically, the controller of the boat 80 is programmed to turn one of the propulsion units 86A, 86B, 86C and 86D while correcting the heading of the boat 80 and the boat 80 is drifting in the drift direction D. The one of the propulsion units 86A, 86B, 86C and 86D is located laterally in the drift direction D relative to the longitudinal center line CL of the boat 80 relative to a hull 82. Also, the one of the propulsion units 86A, 86B, 86C and 86D is located laterally farthest from the longitudinal center line CL of the boat 80 in the drift direction D. Specifically, when the boat 80 is drifting rightward, as illustrated in FIG. 10C, the controller of the boat 80 is programmed to turn the outer right side propulsion unit 86D such that the propulsion axis A88 of the outer right side propulsion unit 86D moves away from the center point CP of the boat 80 in the clockwise direction. Also, in this case, the controller of the boat 80 is programmed to drive only the outer right side propulsion unit 86D to generate one of the forward propulsion force F82 and the reverse propulsion force F82, as illustrated in FIG. 10C. On the other hand, when the boat 80 is drifting leftward, the controller of the boat 80 is programmed to turn the outer left side propulsion unit 86A such that the propulsion axis A82 of the outer left side propulsion unit 86A moves away from the center point CP of the boat 80 in the counterclockwise direction. Also, in this case, the controller of the boat 80 is programmed to drive only the outer left side propulsion unit 86A to generate one of the forward propulsion force and the reverse propulsion force.

Also, the controller of the boat 80 is programmed to fully turn the outer right side propulsion unit 86D relative to the hull 82 to an end of a movable range of the outer right side propulsion unit 86D while correcting the heading of the boat 80 and the boat 80 is drifting rightward. On the other hand, the controller of the boat 80 is programmed to fully turn the outer left side propulsion unit 86A relative to the hull 82 to an end of a movable range of the outer left side propulsion unit 86A while correcting the heading of the boat 80 and the boat 80 is drifting leftward.

Also, the controller of the boat 80 is programmed to turn the outer left side propulsion unit 86A, the inner left side propulsion unit 86B, the inner right side propulsion unit 86C, and the outer right side propulsion unit 86D in the same direction (in the clockwise direction in FIG. 10C) while correcting the heading of the boat 80 and the boat 80 is drifting in the drift direction D (rightward in FIG. 10C).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a boat floating in calm water.

The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A boat comprising:
a hull;
at least one propulsion unit movably mounted to the hull, and having a propulsion axis;
a heading sensor configured to detect a heading of the boat;
a position sensor configured to detect a position of the boat; and
a controller programmed to determine a direction of a component of a current movement of the boat along a widthwise direction of the boat as a drift direction of the boat based on detection results of the heading sensor and the position sensor, the drift direction being a current lateral translation movement direction of the boat relative to a longitudinal center line of the boat,
the controller being further programmed to turn the at least one propulsion unit relative to the hull in a direction according to the drift direction of the boat such that the propulsion axis moves away from a center point of the boat to correct the heading of the boat while the boat is drifting in the drift direction,
the controller being further programmed to steer to a port side such that the at least one propulsion unit turns at a first predetermined angle while the controller determines that the drift direction is directing to a starboard side relative to the longitudinal center line of the boat, and programmed to correct the heading of the board by generating one of a forward propulsion force and a reverse propulsion force by the at least one propulsion unit while maintaining the at least one propulsion unit at the first predetermined angle, and
the controller being further programmed to steer to the starboard side such that the at least one propulsion unit turns at a second predetermined angle while the controller determines that the drift direction is directing to the port side relative to the longitudinal center line of the boat, and programmed to correct the heading of the board by generating one of the forward propulsion force and the reverse propulsion force by the at least one propulsion unit while maintaining the at least one propulsion unit at the second predetermined angle.

2. The boat according to claim 1, wherein
the at least one propulsion unit includes a plurality of propulsion units that are laterally arranged relative to each other, with each of the propulsion units having a propulsion axis.

3. The boat according to claim 2, wherein
the controller is programmed to turn one of the propulsion units that is located laterally in the drift direction relative to the longitudinal center line of the boat such that the propulsion axis moves away from the center point of the boat while correcting the heading of the boat and the boat is drifting in the drift direction.

4. The boat according to claim 3, wherein
the one of the propulsion units is located laterally farthest from the longitudinal center line of the boat in the drift direction.

5. The boat according to claim 3, wherein
the controller is programmed to fully turn the one of the propulsion units relative to the hull to an end of a movable range of the one of the propulsion units while correcting the heading of the boat and the boat is drifting in the drift direction.

6. The boat according to claim 2, wherein the controller is programmed to turn the propulsion units in a same direction while correcting the heading of the boat and the boat is drifting in the drift direction.

7. The boat according to claim 2, wherein the controller is programmed to drive only one of the propulsion units that is located laterally in the drift direction relative to the longitudinal center line of the boat to generate one of the forward propulsion force and the reverse propulsion force while correcting the heading of the boat and the boat is drifting in the drift direction.

8. The boat according to claim 1, wherein the controller is programmed to turn the at least one propulsion unit relative to the hull such that the propulsion axis moves away from the center point of the boat and towards the drift direction while correcting the heading of the boat and the boat is drifting in the drift direction.

9. The boat according to claim 1, wherein the controller is programmed to fully turn the at least one propulsion unit relative to the hull to an end of a movable range of the at least one propulsion unit while correcting the heading of the boat and the boat is drifting in the drift direction.

10. The boat according to claim 1, wherein the controller is programmed to drive the at least one propulsion unit to generate one of the forward propulsion force and the reverse propulsion force while correcting the heading of the boat and the boat is drifting in the drift direction.

11. A heading control method comprising:
detecting a heading of a boat by a heading sensor;
detecting a position of the boat by a position sensor;
determining by a controller a drift direction of the boat based on the heading of the boat and the position of the boat, the drift direction being a lateral movement direction of the boat relative to a longitudinal center line of the boat; and
driving by the controller, based on the drift direction that has been determined, only one of a plurality of propulsion units to generate one of a forward propulsion force and a reverse propulsion force to correct the heading of the boat while the boat is drifting in the drift direction, the propulsion units being movably mounted to a hull of the boat and laterally arranged with respect to each other, the one of the propulsion units being located laterally in the drift direction of the boat relative to the longitudinal center line of the boat.

12. A boat comprising:
a hull;
a plurality of propulsion units movably mounted to the hull, the propulsion units being laterally arranged with respect to each other;
a heading sensor configured to detect a heading of the boat;
a position sensor configured to detect a position of the boat; and
a controller programmed to determine a drift direction of the boat based on detection results of the heading sensor and the position sensor, the drift direction being a lateral movement direction of the boat relative to a longitudinal center line of the boat,
the controller being further programmed to drive, based on the drift direction that has been determined, only one of the propulsion units that is located laterally in the drift direction of the boat relative to the longitudinal center line of the boat to generate one of a forward propulsion force and a reverse propulsion force to correct the heading of the boat while the boat is drifting in the drift direction.

13. A heading control method comprising:
detecting a heading of a boat by a heading sensor;
detecting a position of the boat by a position sensor;
determining by a controller a direction of a component of a current movement of the boat along a widthwise direction of the boat as a drift direction of the boat based on the heading of the boat and the position of the boat, the drift direction being a current lateral translation movement direction of the boat relative to a longitudinal center line of the boat; and
turning by the controller at least one propulsion unit that is movably mounted to a hull of the boat relative to the hull in a direction according to the drift direction of the boat such that a propulsion axis of the at least one propulsion unit moves away from a center point of the boat to correct the heading of the boat while the boat is drifting in the drift direction,
the turning of the at least one propulsion unit to correct the heading of the boat including
steering to a port side such that the at least one propulsion unit turns at a first predetermined angle while determining that the drift direction is directing to a starboard side relative to the longitudinal center line of the boat, and correcting the heading of the board by generating one of a forward propulsion force and a reverse propulsion force by the at least one propulsion unit while maintaining the at least one propulsion unit at the first predetermined angle, and
steering to the starboard side such that the at least one propulsion unit turns at a second predetermined angle while determining that the drift direction is directing to the port side relative to the longitudinal center line of the boat, and correcting the heading of the board by generating one of the forward propulsion force and the reverse propulsion force by the at least one propulsion unit while maintaining the at least one propulsion unit at the second predetermined angle.

* * * * *